(12) United States Patent
Aoki

(10) Patent No.: US 7,834,913 B2
(45) Date of Patent: Nov. 16, 2010

(54) METHOD OF MAKING DIGITAL PHOTOGRAPH AND DIGITAL PHOTOGRAPH MADE BY THAT METHOD

(75) Inventor: Akira Aoki, 2-29, Ida 1-chome, Kawasaki-shi, Kanagawa (JP) 211-0035

(73) Assignee: Akira Aoki, Kawasaki-shi (JP)

( * ) Notice: Subject to any disclaimer, the term of this patent is extended or adjusted under 35 U.S.C. 154(b) by 804 days.

(21) Appl. No.: 11/808,987

(22) Filed: Jun. 14, 2007

(65) Prior Publication Data
US 2008/0111895 A1  May 15, 2008

Related U.S. Application Data

(63) Continuation-in-part of application No. 10/223,632, filed on Aug. 20, 2002, now Pat. No. 7,262,794.

(30) Foreign Application Priority Data
Aug. 20, 2001 (JP) .............................. 2001-287825

(51) Int. Cl.
H04N 5/228 (2006.01)
H04N 9/04 (2006.01)
H04N 5/235 (2006.01)
H04N 5/262 (2006.01)
G06K 9/00 (2006.01)

(52) U.S. Cl. .............................. 348/222.1; 348/207.99; 348/221.1; 348/239; 348/362; 382/167

(58) Field of Classification Search ............. 348/220.1, 348/221.1, 222.1, 207.99, 207.1, 207.2, 362, 348/223.1, 239; 382/167; 358/518
See application file for complete search history.

(56) References Cited

U.S. PATENT DOCUMENTS

| | | | | |
|---|---|---|---|---|
| 4,862,205 A | * | 8/1989 | Kawamura | ................... 396/222 |
| 5,877,810 A | * | 3/1999 | Inuiya et al. | ................. 348/362 |
| 6,177,958 B1 | * | 1/2001 | Anderson | .................... 348/362 |
| 6,536,960 B2 | * | 3/2003 | Kubo et al. | ............. 348/333.09 |
| 6,594,388 B1 | * | 7/2003 | Gindele et al. | ............... 382/167 |
| 6,760,064 B1 | * | 7/2004 | Miyazaki | .................. 348/220.1 |
| 6,919,970 B2 | * | 7/2005 | Aoki | ........................... 382/209 |
| 6,975,437 B2 | * | 12/2005 | Takemoto | .................... 348/279 |
| 6,980,233 B1 | * | 12/2005 | Hirasawa | .................. 348/207.1 |
| 2006/0028553 A1 | * | 2/2006 | Mori et al. | ............. 348/207.99 |

\* cited by examiner

Primary Examiner—Nhan T Tran
(74) Attorney, Agent, or Firm—Kenyon & Kenyon LLP

(57) ABSTRACT

A method of making a digital photograph composed of a moving water element and still element by applying a known computer image processing system, and a digital photograph made by this method, involves taking a basic photograph indicating a realistic image of still elements and photographs taken by applying a series of shutter speeds. A series of digital images corresponding to the above-mentioned photographs are indicated on a monitor of the processing system, and an image indicating a realistic image of the moving water element is selected from the series of digital images. A color matching operation is them applied to the selected digital image whereby a final digital image having a still element substantially color matched to that of the basic photograph and a realistic image of a moving water element is indicated on the monitor, and thereafter a realistic digital photograph is printed based upon the final image.

3 Claims, 40 Drawing Sheets

METHOD OF MAKING DIGITAL PHOTOGRAPH AND DIGITAL PHOTOGRAPH MADE BY THAT METHOD

RELATED APPLICATIONS

This is a continuation-in-part of application Ser. No. 10/223,632, filed Aug. 20, 2002 now U.S. Pat. No. 7,262,794, which claims priority to Japanese Application No. 2001-287825, filed Aug. 20, 2001.

BACKGROUND OF THE INVENTION

The present invention relates to a method of making a digital photograph including the work of photographing a subject comprised of moving elements and still elements surrounding the same, in particular a subject including flowing water as a moving element, and improving the digital photograph by a computer image processing technique.

In the long practiced art of taking silver film photographs, when photographing a subject comprised of moving elements including water such as a waterfall or rapids and still elements such as the scenery surrounding them, as clear from the numerous photographs (clearly indicating the photographic conditions) described in for example Takao Otsuka, Utsukushiki Nihon no Kawa (Beautiful Rivers of Japan), taking the photograph at the so-called "slow shutter speed" of $1/30$ second etc. has been recommended as a condition for photographing such moving elements. The specifications for the recently popularized digital cameras also follow this.

There is however still a doubt as to whether photographs taken by such a traditional photographic technique, leaving aside the aesthetic evaluation, can be said to substantially match with the actual visual perception. The present inventor has long held doubts over photography by this slow shutter speed in view of his experience in taking photographs during studies of the dynamics of high speed rotating objects.

It is known that, in the case of photographing a subject comprising a core formed by a moving water element such as a waterfall or mountain stream and still elements such as trees surrounding the core, if a high shutter speed corresponding to the running speed of the core is applied to take a photograph of such subject, the characteristic feature of the moving element can be captured as a photograph precisely, while the total image of the photograph becomes darker in comparison with the visual recognition by a normal human being. Therefore, the darkness of the photograph of the above-mentioned subject obtained by the high shutter speed cannot generally be accepted, in spite of the effective result indicating a realistic image of the moving element which is obtained by the application of the high shutter speed.

The applicant conceived that, if the above-mentioned problem due to the darkness of photograph can be eliminated under the condition of keeping the realistic image of the moving element, the photograph of the subject comprising the above-mentioned core and the still elements surrounding the core can be accepted in the photographic society. This is the origin of conceiving the present invention.

However, such changes in the darkness of a photograph are also affected by such conditions of the setting diaphragm of lens, and ISO sensitivity of the film used (note: in the case of using a Digital camera, setting value of ISO Sensitivity). Therefore, before arriving at the present invention, the following basic research for confirming the influence of the shutter speed on the darkness of the photograph was carried out in consideration of the influence of the "diaphragm condition", "ISO sensitivity of film" used (note: in the case of using a digital camera, setting value of ISO Sensitivity), by four successive experiments.

[First Experiment]

To achieve the object of the present invention, the present inventor studied what kind of shutter speed was suitable and whether photography by the so-called "slow shutter speed" which had been recommended in the case of photographing rapids, waterfalls, etc. was truly optimal for taking a photograph of a realistic image (first experiment). That is, he took photographs of the scene at the fountain plaza at the Imperial Palace Outer Garden (scene mainly of fountains) using a Nikon F-80 camera and ASA100 film (Kodak E100SW), setting the exposure compensation to ±0 and the shutter speed divided into nine stages in the range of $1/15$ second to $1/4000$ second (details shown in Table 1), and using shutter priority AE. He then requested a local photo lab to develop the positive film, read the obtained film by a scanner of a second computer image processing system (owned by the present inventor), stored the digital data in a computer (Macintosh G3), and made a comparative study of the digital images displayed on the monitor. Further, the camera had the function of automatic adjustment of the diaphragm for maintaining suitable exposure. For reference, the diaphragm values corresponding to the shutter speeds are also shown in Table 1.

TABLE 1

| FIG. No. | S (seconds) | V |
|---|---|---|
| 1 | $1/15$ | *22 (+2) |
| 2 | $1/30$ | *22 (+2) |
| 3 | $1/60$ | 22 (+1) |
| 4 | $1/125$ | 22 |
| 5 | $1/250$ | 16 |
| 6 | $1/500$ | 11 |
| 7 | $1/1000$ | 8 |
| 8 | $1/2000$ | 5.6 |
| 9 | $1/4000$ | 2.8 |

S: Shutter speed (seconds),
V: diaphragm,
*Suitable exposure compensation limit exceeded

TABLE 2

| Equipment used | First system | Second system |
|---|---|---|
| Computer | Macintosh G4 | Macintosh G3 |
| MO drive | Olympus Servo MO 640C | Same as first system |
| Scanner | Microtec Scanmaster 4 | Same as first system |
| Printer | Epson 2000 C | Same as first system |
| Monitor | Mitsubishi Diamond RD21G | Same as first system |

Further, for convenience, when printing a digital image displayed on the monitor in the above-mentioned computer image processing system, if using a known color calibration technique, it is possible to easily make a digital photograph of color substantially matching the color (brightness, contrast, chroma, and color balance) of the digital image, so in the following explanation, the "digital image displayed on the monitor corresponding to the digital photograph of FIG. X" is expressed as the "digital image of FIG. X" for simplification of the explanation.

As clear from FIG. 1 to FIG. 9, when the shutter speed is extremely slow ($1/30$ second or less), the contrast between the moving elements, that is, the fountains, and the still elements (the surrounding trees etc.) falls and the fountains are captured in just the state of jets of water. As opposed to this, when the shutter speed becomes 1/60 second or more, the contrast between the moving elements and the still elements becomes higher and even the drops of water of the fountains are clearly captured, it is found. Further, it was learned that this change is related nonlinearly with the change of the shutter speed, that is, the change slows at a certain degree of speed or more (in this experiment, 1/500 second). Further, it was confirmed that the slower the shutter speed, the darker the photograph. When viewed visually, not just the state of the jets of water, but the state of the presence of falling drops of water in the jets of water is perceived in reality, so it was confirmed that taking a photograph at the above slow shutter speed is not in line with the object of the present invention. Note that it is self-evident that the same results are obtained even when using a camera not having the function of automatic adjustment of the photographic conditions, if adjusting the diaphragm value and the shutter speed by manual operation based on data clear from this experiment.

[Second Experiment]

Next, a commercially available digital camera (EOS D-30) was used to take photographs of the scene centered around the fountains in the Imperial Palace Outer Garden in the same way as the above-mentioned photographic experiment at an ISO sensitivity of 100 and shutter speed priority changing the shutter speed to several stages (shutter speeds etc. shown in Table 3). The digital data obtained by this was stored in the computer G4 of the first system shown in Table 2 from a CF card and the digital images (FIG. 10 to FIG. 23) displayed on the monitor.

TABLE 3

| FIG. No. | S (seconds) | V |
|---|---|---|
| 10 | 1 | *22 |
| 11 | 1/10 | *22 |
| 12 | 1/20 | *22 |
| 13 | 1/30 | *22 |
| 14 | 1/60 | 22 |
| 15 | 1/125 | 19 |
| 16 | 1/250 | 16 |
| 17 | 1/350 | 13 |
| 18 | 1/500 | 11 |
| 19 | 1/750 | 9.5 |
| 20 | 1/1000 | 8 |
| 21 | 1/2000 | 4.5 |
| 22 | 1/3000 | 3.5 |
| 23 | 1/4000 | *3.5 |

S: Shutter speed (seconds),
V: Diaphragm of lens,
*Suitable exposure compensation limit exceeded In this experiment (second experiment), photographs were taken at a constant exposure compensation condition (.0) and a shutter speed set to a shutter speed of 14 stages from 1 second to 1/4000 second. The digital images obtained by this photographic experiment were studied compared with each other by FIG. 10 to FIG. 23. As a result, it was confirmed that the images almost completely matched the results of the above second experiment using a silver film camera. Therefore, a detailed explanation will be omitted. Further, since the camera had an automatic adjustment mechanism for automatically adjusting the diaphragm in accordance with a change in the shutter speed to maintain a suitable exposure, the diaphragm values corresponding to the shutter speed are also given in Table 3 for reference.

Both when using a silver film camera and when using a digital camera by the above experiment, similar results are obtained, so in consideration of work efficiency, the above-mentioned digital camera was used in the following photographic experiments.

[Third Experiment]

Further, the third experiment was conducted with the intention of supplementing the above experimental findings.

That is, in this photographic experiment, the ISO sensitivity was fixed to 100, the shutter speed was set to 1/500 second, and the exposure compensation was adjusted to the five stages of −2, −1, ±0, +1, and +2 to investigate the effects on the photograph quality. In the same way as the above experiments, photographs were taken giving priority to the shutter speed (AE). The changes in the diaphragm value were recorded, whereupon only naturally the diaphragm was set as the exposure compensation proceeded from the minus side to the plus side as 8, 5.6, 4.0, and 3.5 These photographic conditions are shown in Table 4.

TABLE 4

| FIG. No. | E | V |
|---|---|---|
| 24 | −2 | 8 |
| 25 | −1 | 5.6 |
| 26 | ±0 | 4.0 |
| 27 | +1 | 3.5 |
|  | +2 | +3.5 |

S: Shutter speed (1/500 second),
E: Exposure compensation,
V: Diaphragm,
*Suitable exposure compensation limit exceeded The results of the comparison of the digital images (monitor display) obtained in this experiment show, as shown in FIG. 24 to FIG. 27, that by moving the exposure compensation to the minus side, the contrast becomes stronger at the details of the moving elements and the moving elements can be captured realistically as a result, but on the other hand the digital image gradually becomes darker.

Note that with an exposure compensation of +2, the diaphragm of lens exceeds the minimum limit and the digital image also becomes too white, so this case was omitted from the series of attached drawings.

From the above experimental findings, it was confirmed that in order to photograph in particular a subject comprised of moving elements including flowing water and still elements and realistically capture even details of the moving water elements, regardless of whether using a silver film camera or a digital camera, it is necessary to photograph it not by the so-called "slow shutter speed", but by a faster shutter speed and it was confirmed that taking the photograph darker is desirable. Note that it was learned that the suitable shutter speed corresponds to the speed of change over time of the moving water elements from the experimental findings of the later explained Embodiments 1 and 2.

According to the results of the above-mentioned experiments, it was confirmed that the dynamic feature of running water, such as a water fall or mountain stream, can be correctly represented as a photograph, if the photograph is taken at a shutter speed corresponding speed of the running water, although the entire photographic image becomes too dark so that the quality of the photograph cannot be accepted. Therefore, it is necessary to solve this problem.

In general, it is well known that the darkness of a photograph (digital image) can be easily corrected by applying a computer image processing technology which is disclosed in software such as Adobe Photoshop 5.5 (Registered Trade Mark), that is, such correction of darkness can be carried out by a simple modification of darkness, or the modification of darkness in relation to contrast, and accordingly by the modification of a tone curve. However, it is quite vague which type of corrections mentioned would be suitable to correct the darkness of the photograph created by applying a high shutter speed, and therefore, the following fourth experiment was carried out to clarify this problem.

[Fourth Experiment]

The fourth experiment was conducted to throw light on this question. That is, as the original digital image of this experiment and the comparative digital image to be used in the work, the digital images of FIG. 15 and FIG. 22 were selected from the digital images obtained in the above second experiment (for convenience, shown as FIG. 28 and FIG. 19). Further, the darkness of the digital image of FIG. 29, that is, the photograph taken at a shutter speed of $1/3000$ second, was compared with that of digital images (FIG. 30 to FIG. 36) obtained by simply adjusting the brightness, adjusting a combination of the brightness and contrast, and adjusting the gradation, including adjusting the contrast for safety's sake, with the objective of correcting them to the brightness of the digital image (FIG. 28). As a result, it was confirmed that while the adjustment of just the brightness or the adjustment of just the contrast is completely unsuitable, adjustment by the latter two can be adopted. Table 5 shows the relationship between the content of the adjustment work and the drawings.

TABLE 5

| FIG. No. | Content of image processing | |
|---|---|---|
| 28 | Original image (same as FIG. 15) | |
| 29 | Original image (same as FIG. 22) | |
| 30 | Original image 29: Brightness adjustment (+35) | |
| 31 | Original Image 30: Contrast adjustment (+25) | |
| 32 | Original image 32: Brightness adjustment (+30) | |
| 33 | Original image 32: Contrast adjustment (+19) | |
| 34 | Original image 33: Brightness adjustment (+50) | |
| 35 | Original image 34: Contrast adjustment (+22) | |
| 36 | Original image 29: Tone curve | The brightness of the original digital image (input) and adjusted brightness (output) are shown in Table 8 as input values and output values for each of the tone curves A, B, and C of FIG. 62. |

Note that the fact that similar results are obtained by combined adjustment of the brightness and contrast and adjustment of the gradation can be understood from theoretical explanations relating to the parameters for physical evaluation of images, for example, Yoichi Mitake, *Dejitaru Karaa Gazo no Kaiseki-Hyoka* (*Analysis and Evaluation of Digital Color Images*) (page 91).

Here, when adopting the method of combined adjustment of the brightness and contrast for adjustment of the brightness of a digital image displayed on a monitor, the problem remains of what extent of adjustment of the brightness to perform first. It was confirmed that this problem is solved by the technique of adjusting the brightness of the original image (FIG. 29) to close to the brightness of FIG. 28 by adjusting the brightness, then adjusting the contrast to make the brightness of the digital image as a whole closely match that of FIG. 28. This fact is proved by the fact that when comparing FIG. 31 and FIG. 33, the brightness and contrast both substantially match.

Further, it was confirmed that it is possible to obtain similar results by adjusting the gradation by a known technique (adjustment of input and output of tone curve dialog box) (FIG. 36). For reference, the data of gradation adjustment is shown in Table 8 with reference to FIG. 62.

Note that FIG. 62 shows a known tone curve added with data display coordinates A, B, and C for the purpose of explaining the detailed content of gradation adjustment.

From this series of experiments, the photographic conditions for preparing a realistic digital photograph starting from a photograph obtained by photographing moving elements including flowing water and still elements and the technique for improving this digital photograph to a realistic digital photograph by computer image processing became clear. This is the crux of the present invention.

SUMMARY OF THE INVENTION

The present invention was developed based on the results obtained by the above preliminary experiments. That is, the present invention has as its basic technical idea to photograph a subject comprised of a moving water element and still elements surrounding it, in particular a subject including flowing water as a moving element, using a digital camera or silver film camera at a high shutter speed corresponding to the speed of change over time of the moving water element, storing the taken photograph as digital data in a computer of a computer image processing system (in the case of silver film photography, storing the image data as digital data in the computer through the scanner of the computer image processing system and, in the case of a photograph by a digital camera, storing the data in the computer directly or through a CF card or other storage medium), correcting a digital image displayed on the monitor of the image processing system by simple adjustment of gradation or combined adjustment of brightness and contrast (first adjusting the brightness and then adjusting the contrast) so as to obtain a realistic digital image stressing in particular the moving water element, and thereby preparing a realistic digital photograph substantially matching the visual perception by this corrected digital image displayed on the monitor. Note that the above-mentioned "high shutter speed", as clear from the explanation of the later examples, indicates a shutter speed of at least $1/350$.

It must be noted that the present invention based upon the above-mentioned basic technical idea needs to overcome the practical problems such as how to confirm whether the digital photograph created by the present invention can be accepted as substantially identical to the visual image or not, or how to find a shutter speed that satisfies the requirement of the present invention. However, these problems can be solved practically, for example, the first mentioned problem is solved practically by using a photograph which is obtained by a standard shutter speed such as the automatically set shutter speed in the case of photographing based upon a programming mode, and the second mentioned problem is solved practically by applying a series of several shutter speeds which involves for example, an estimated flow speed of water, as indicated in the following explanation of the embodiments.

BRIEF EXPLANATION OF THE DRAWINGS

The patent or application file contains at least one drawing executed in color. Copies of this patent or patent application publication with color drawings will be provided by the Office upon request and payment of the necessary fee.

DESCRIPTION OF PREFERRED EMBODIMENTS

As already explained, in the experiments of the following embodiments, the experiments were conducted using as a camera for the photography the above-mentioned digital camera (Canon D-30) (ISO sensitivity: 400) except for the experiment of Example 4 (using a Nikon Dlx) and using a computer image processing system shown in Table 2, that is, a computer image processing system comprised of a Macintosh G3 or G4 computer, an Olympus Servo MO 640C MO drive, and an Epson 2000C printer. Further, in the experiments, the photographs were taken using a number of pixels stored of 2160.times.1440, a compression ratio of about 1.3 MB, and a photographic mode of shutter priority (Tv). In the case of Example 4, the photographs were taken using a FINE image mode and shutter priority mode.

First Embodiment

In the experiment of this embodiment, a gully directly upstream of the Ryuzu Falls in Nikko, Japan was selected as the subject. The Ryuzu Falls is counted as one of the three famous waterfalls of the Nikko National Park along with the Kegon Falls and the Yudaki Falls. In particular, the scenery in the autumn is particularly widely known in Japan and overseas through magazines and picture postcards. However, with these scenic photographs (picture postcards), it could be found that the majority of the water falling at the rapid speed is displayed in a state of white strips or far from the visual perception. Further, to achieve the object of the present invention, the necessity for photographing the subject at a shutter speed corresponding to the condition found in the above preliminary experiments, that is, the speed of change over time of the moving water element, was confirmed.

First, the content of the experiments of this embodiment will be explained with reference to Table 6 (showing photographic conditions) and FIG. 37 to FIG. 43

[Selection of Shutter Speed]: The technique was adopted of making use of the sophisticated functions of the digital camera used for the photography, even though a compact camera, adopting the method of selecting the shutter speed by interpolation (note: Sugaku Jiten (Mathematical Dictionary), 3rd edition, p. 387C, published by Iwanami Shoten), performing the experiment while dividing the range from 1/30 second to 1/4000 second into six stages as shown in Table 6, and selecting the digital image meeting the objective from the digital images obtained by this photographic experiment.

TABLE 6

Figure 42:
FIG. 42 is a digital photograph of the case of photographing the same subject setting the shutter speed to 1/4000 second.
Figure 43:
FIG. 43 is a digital photograph obtained by image processing of a still element by computer image processing using FIG. 42 as an original image so as to make it substantially match a standard photograph in color.

| FIG. No. | S | E | V |
|---|---|---|---|
| 37 | 1/30 | +2 | 19 |
| 38 | 1/125 | +0.5 | 22 |
| 39 | 1/250 | ±0 | 19 |
| 40 | 1/750 | ±0 | 9.5 |
| 41 | 1/2000 | ±0 | 5.6 |
| 42 | 1/4000 | ±0 | 4.5 |
| 43 | | Prepared by image processing using FIG. 42 as original image | |

S: Shutter speed,
E: Exposure compensation,
V: Diaphragm value

[Photographic Results (Digital Image)]: As clear from the digital photographs (FIG. 37 to FIG. 42) corresponding to the shutter speeds, it was learned that even when the shutter speed is the standard shutter speed of 1/125 second, the rapids have considerable white strip-like portions, the photograph as a whole gradually becomes dark along with the rise in the shutter speed over that, but the difference in contrast at the details of the rapids becomes clear, but over a certain limit (specifically, over 1/750 second), the change-in contrast becomes slower. Comparing these digital photographs, the digital photograph of FIG. 42 was selected as the digital image for image processing since its contrast at details of the rapids was superior.

[Correction of Darkness]:

Based upon the knowledge obtained from the above-mentioned fourth experiment, it was possible to create the brightness (light condition) of the digital image indicated on the monitor (corresponding to the digital photograph FIG. 42) to a modified digital image of which brightness being substantially matching to the visual perception of the digital photograph of FIG. 42, by three steps of gradual modification of brightness in relation to the contrast, while substantially maintaining the contrast of the mountain stream (moving water element). Incidentally, the above-mentioned processing operation can be effectively carried out by indicating the digital photograph of FIG. 38 beside the digital image of the photograph FIG. 42 on the monitor.

Further, in this case as well, when there is a need to display a moving water element more realistically, this problem is solved by performing the above image processing while separating the moving water element and still elements, processing to strongly hold the contrast particularly at the details of the moving water element, and combining the image processed moving water element and still elements by a known technique.

The problem remains, however, of how to select the comparative image. This problem has also been solved in practice as follows: That is, since it has been recognized from the past that a photograph taken at a shutter speed of around 1/125 second and a suitable diaphragm substantially matches the visual perception of the subject, a photograph (FIG. 38) obtained by photographing the subject under these photographic conditions was used as the comparative subject in this image processing. Note that this shutter speed has to be changed in accordance with the weather, light, and other photographic conditions and, in the case of silver film photography, the sensitivity of the film. Further, it is of course possible to adopt as the above material for judgement a photograph taken by a currently popular camera having an automatic exposure adjustment function, a photograph accepted as substantially matching the visual perception of large numbers of persons, picture postcards, printed matter, etc.

The following image processing work was performed in accordance with the above experimental conditions: That is, since the trees surrounding the rapids in the above digital image (monitor display) of FIG. 42 are unnaturally dark compared with the corresponding portion of the digital image (FIG. 38) of the comparative image, the following image processing was performed to correct the brightness of that portion. First, that portion was selected and then adjusted in brightness (+27) and then contrast (+10), the unnaturalness in the boundary between that portion and other portions was removed, and thereby the final digital image shown in FIG. 43 was prepared.

Further, in the case of the above experiments (First and Second experiments), it was possible to take a photograph at a shutter speed of 1/60 second in a state visually perceiving the fountains, but it became clear in those experiments that this degree of shutter speed was too slow and that it must be 1/250 second at the slowest. This fact shows that "the shutter speed of photography required for producing a realistic digital photograph by photographing a subject comprised of a moving water element and still elements" has to be set corresponding to the speed of the moving water element. Therefore, the photographic technique of employing a plurality of shutter speeds obtained by interpolation (plural shutter speeds, which involve a shutter speed A corresponding to the estimated running or variation speed of the moving water element and plural shutter speeds lower and higher than the above-mentioned shutter speed A, are systematically applied) used in the experiment of this example was confirmed to be practically valuable due in part to the effect of the superior operability of the camera used.

Second Embodiment

This embodiment is a photographic experiment of a scene including the Yudaki Falls of Nikko, Japan after the experiment of Embodiment 1 on the same day. In this experiment, the photographs were taken by selecting the shutter speed by interpolation in the same way as the photographic experiment of First embodiment. That is, the photographic experiment was conducted giving priority to the shutter speed (AE) at shutter speeds of five stages from 1/30 second to 1/4000 second. The content of the experiment is shown in Table 7.

TABLE 7

Figure 44:
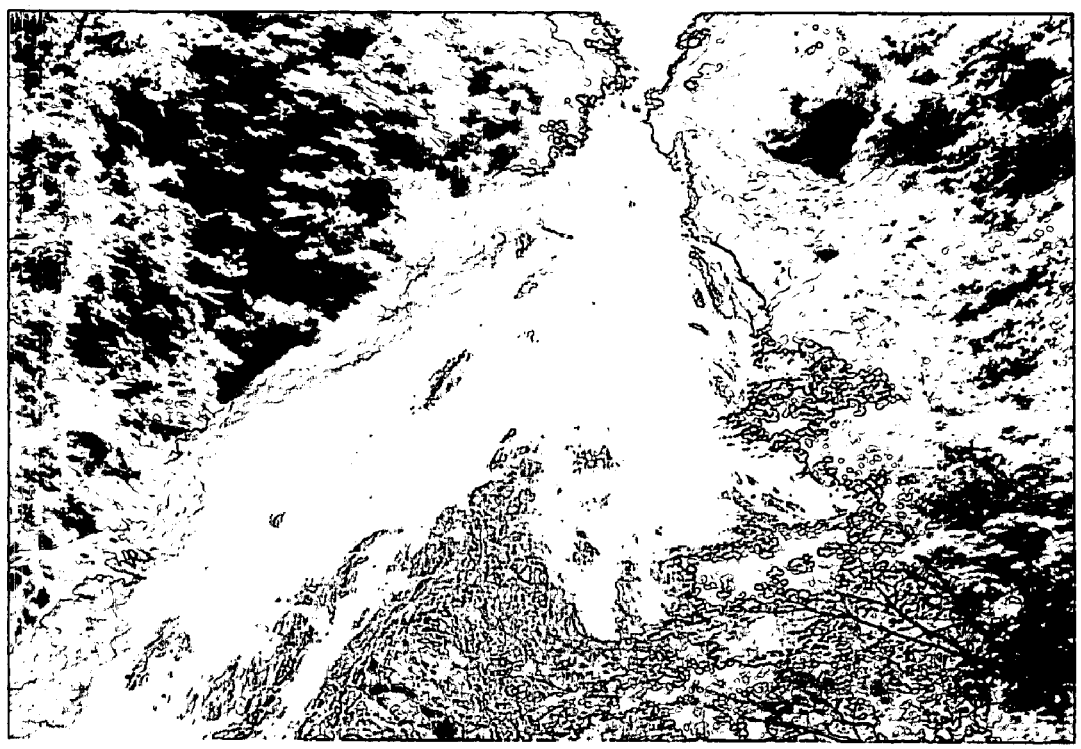
FIG. 44 is a digital photograph of the case of photographing as a subject the Yudaki Falls in Nikko, Japan setting the shutter speed to 1/125 second in a series of experiments conducted using this subject.
Figure 45:
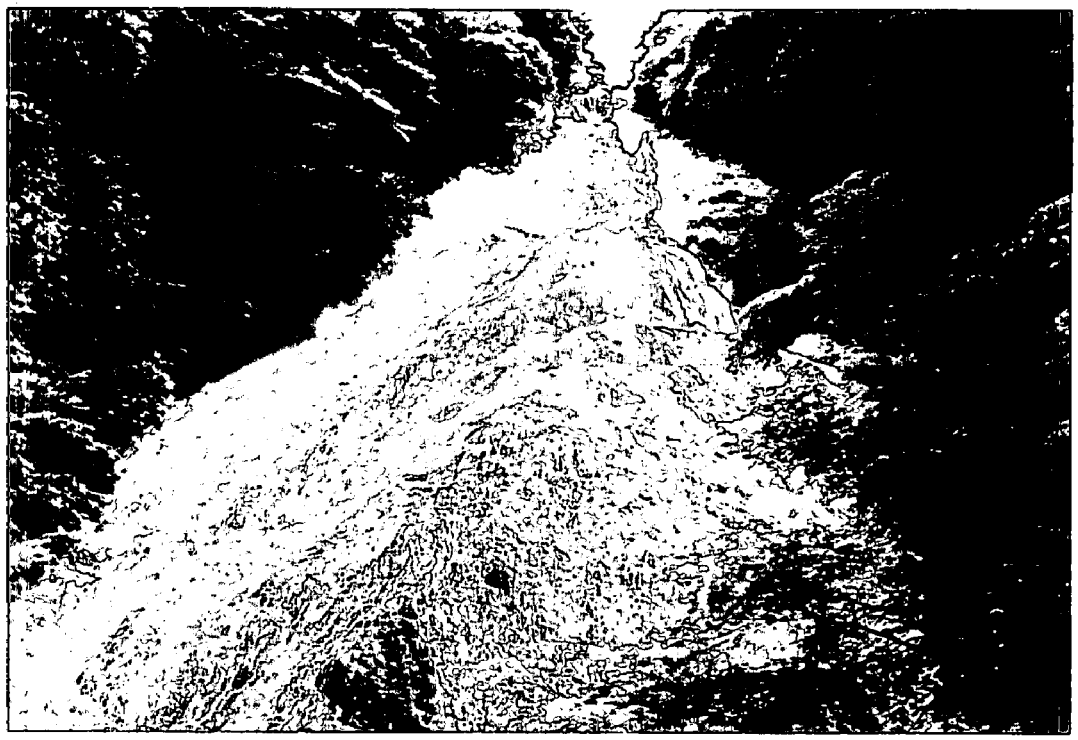
FIG. 45 is a digital photograph of the case of photographing the same subject setting the shutter speed to 1/4000 second.

| FIG. No. | Shutter speed (sec) | Diaphragm | Exposure compensation |
|---|---|---|---|
|  | 1/30 | 19 | +2 |
| FIG. 44 | 1/125 | 22 | +0.5 |
|  | 1/250 | 19 | ±0 |
|  | 1/750 | 9 | ±0 |
| FIG. 45 | 1/4000 | 16 | ±0 |

Figure 46:
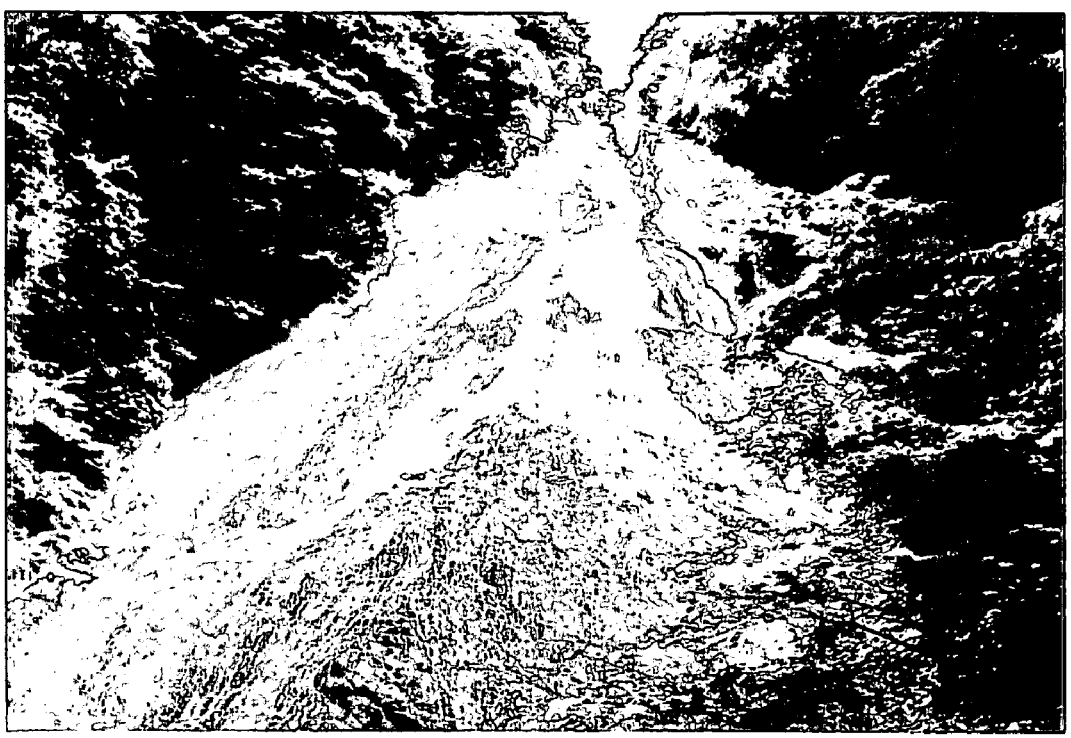
FIG. 46 is a digital photograph prepared by adjusting the brightness and gradation of the digital image of FIG. 45 as a whole.
Figure 47:
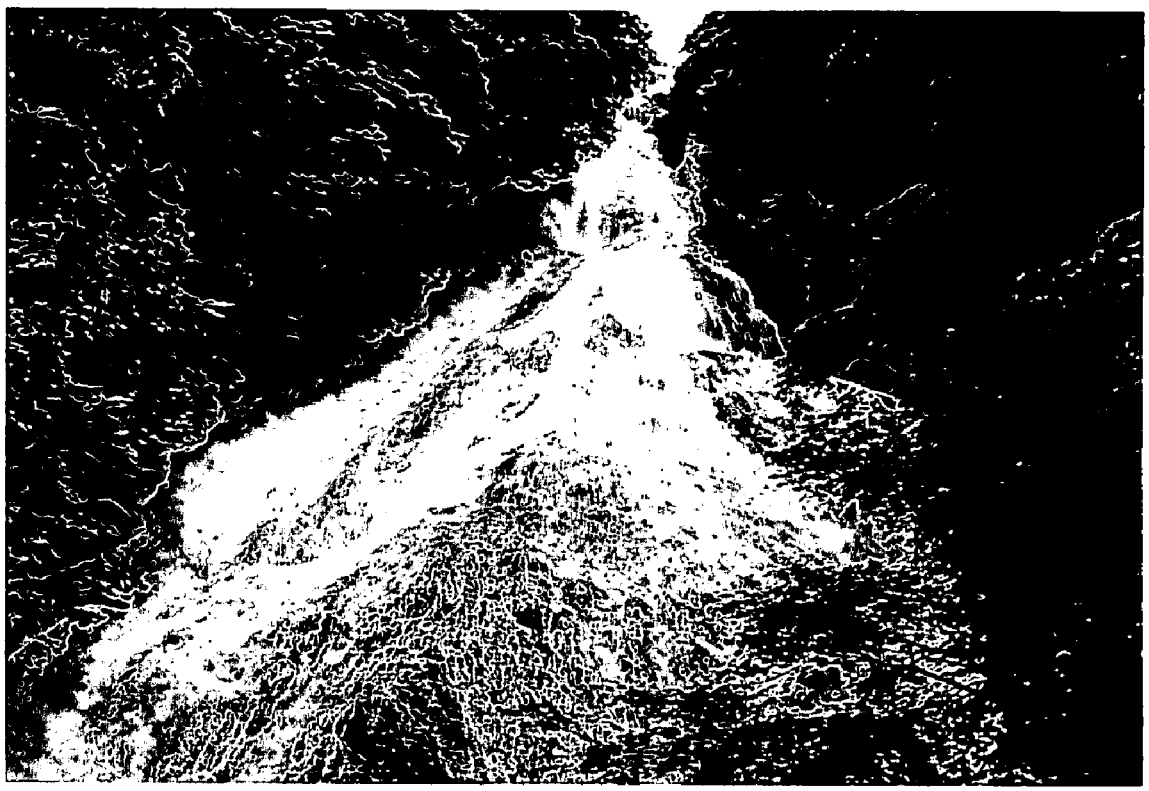
FIG. 47 is a digital photograph prepared by processing a digital image corresponding to the digital photograph of FIG. 46.

The inventor stored the digital data obtained by this in the computer G4 of the above computer image processing system 1 from a CF card, displayed the digital images on the monitor, and compared the digital images of the monitor display, whereby he judged that a shutter speed of 1/4000 second (FIG. 45) showed the Yudaki Falls well. The rapids portion, however, was darker than the digital image photographed at a shutter speed of 1/125 second (FIG. 44), so the brightness of the digital image (FIG. 45) as a whole was adjusted by adjustment of the gradation (Table 8) to prepare another digital image (FIG. 46). Since the tree portion occupying the portion left of the rapids was still darker than the above digital image (FIG. 44), the corresponding portion of the digital image (FIG. 44) was clipped by a known technique and pasted on the corresponding portion of the digital image (FIG. 46). As a result, it was possible to display the desired digital image (FIG. 47) on the monitor.

Figure 48:
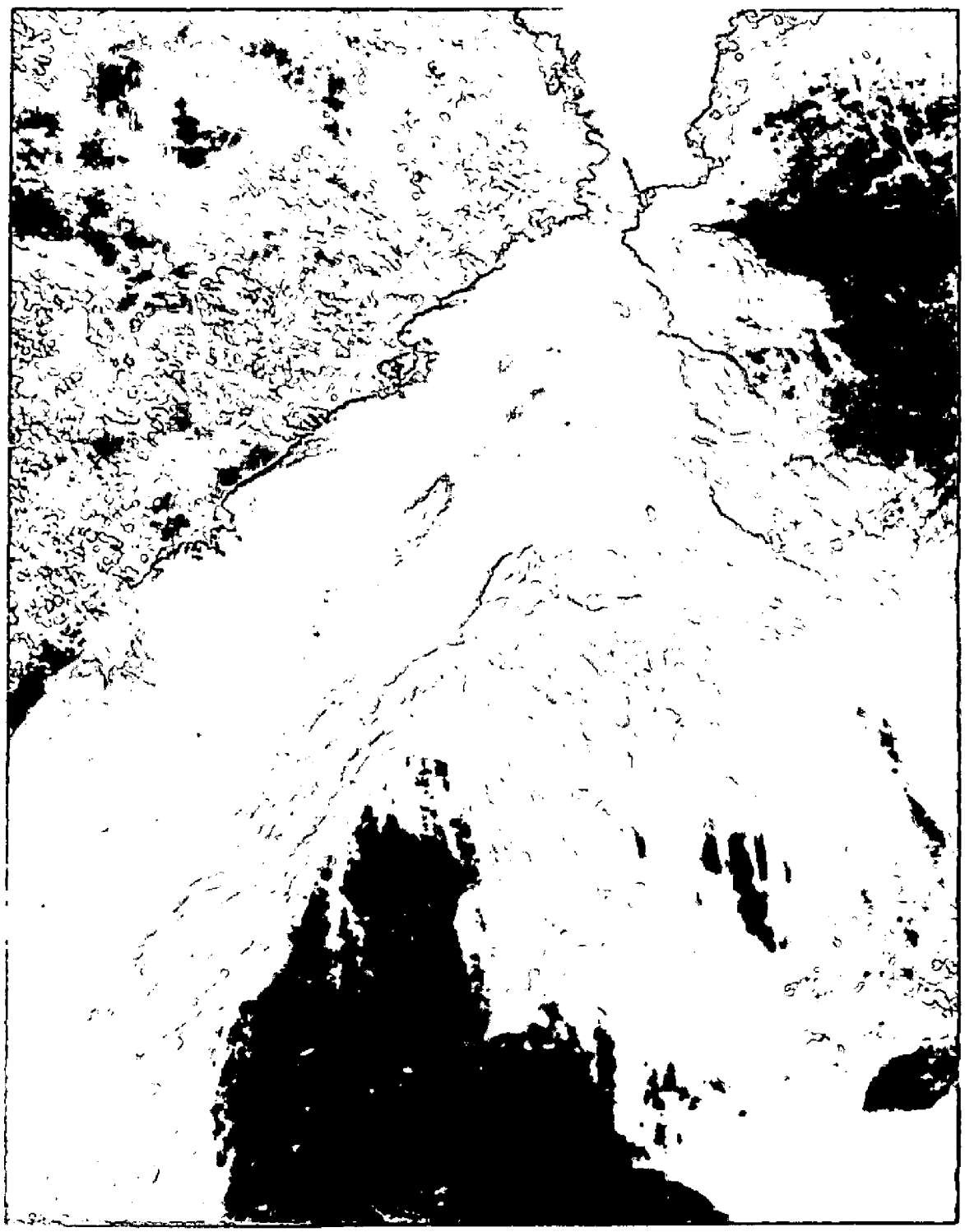
FIG. 48 is a digital photograph obtained by copying a picture postcard of the Yudaki Falls sold at Nikko, Japan.

Further, for reference, a copy of a picture postcard (Yudaki Falls) commercially sold at Nikko is shown in FIG. 48.

Third Embodiment

This embodiment shows the results of an experiment of photographing a scene including waves breaking against the seawall at Jogasaki in Izu, Japan.

Figure 49:
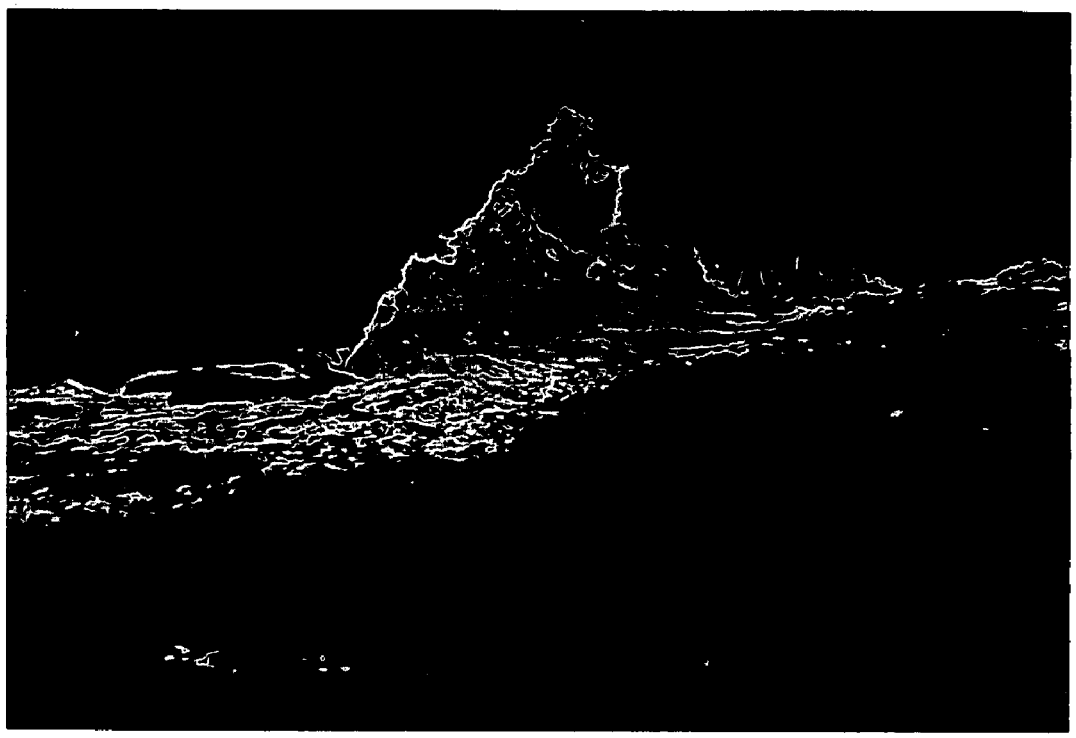
FIG. 49 is a digital photograph taken of waves breaking against the seawall at the Jogasaki seacoast using a shutter speed of 1/4000 second and an exposure compensation of +2.
Figure 50:
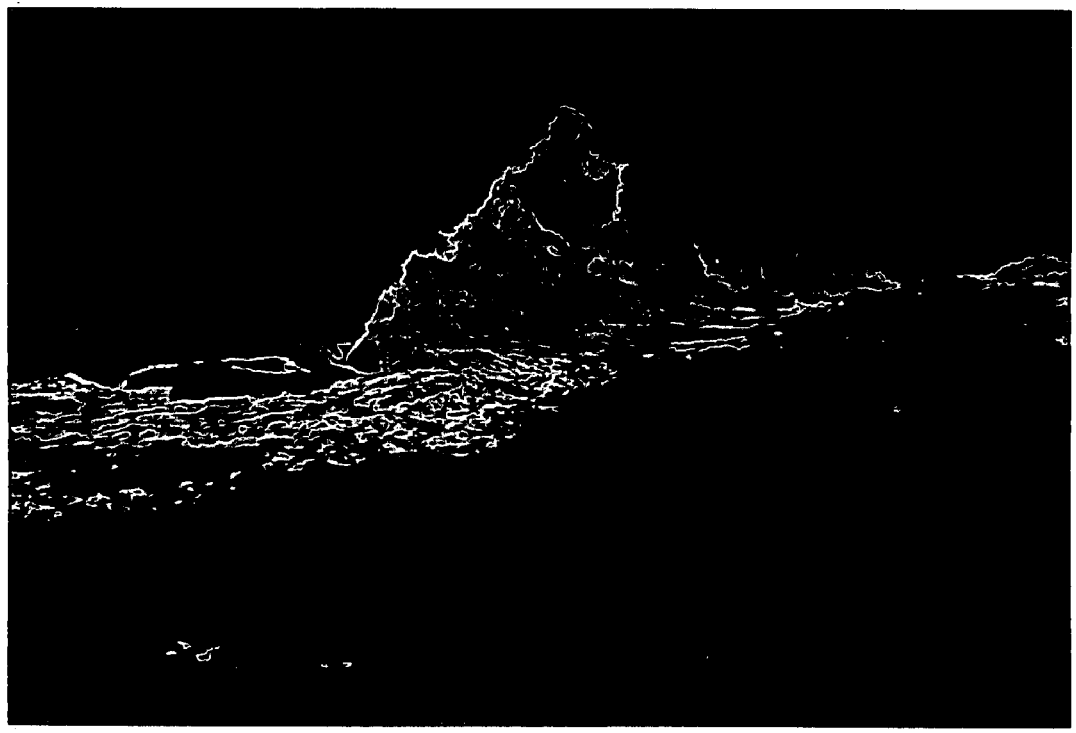
FIG. 50 is a digital photograph taken of the same subject using a shutter speed of 1/125 second and a standard exposure compensation of ±0.

In the case of this subject, the waves breaking against the seawall strike the seawall and break apart at substantially constant intervals. The waves themselves deform at a considerably fast speed, so to capture them realistically, it is necessary to set the shutter speed at a high speed. Therefore, based on the discoveries obtained in Examples 1 and 2, a photographic experiment was conducted at the four stages of shutter speeds of 1/125, 1/250, 1/500, and 1/4000 second. As a result, it was learned that the photographic result when making the shutter speed 4000/sec. and making the exposure compensation +2 (FIG. 49) expressed the waves most realistically. On the other hand, it was confirmed that the seawall which the waves struck was extremely dark compared with the digital image (FIG. 50) obtained by photography under the standard photographic conditions (shutter speed of 1/125 second, exposure compensation ±0).

Figure 52:
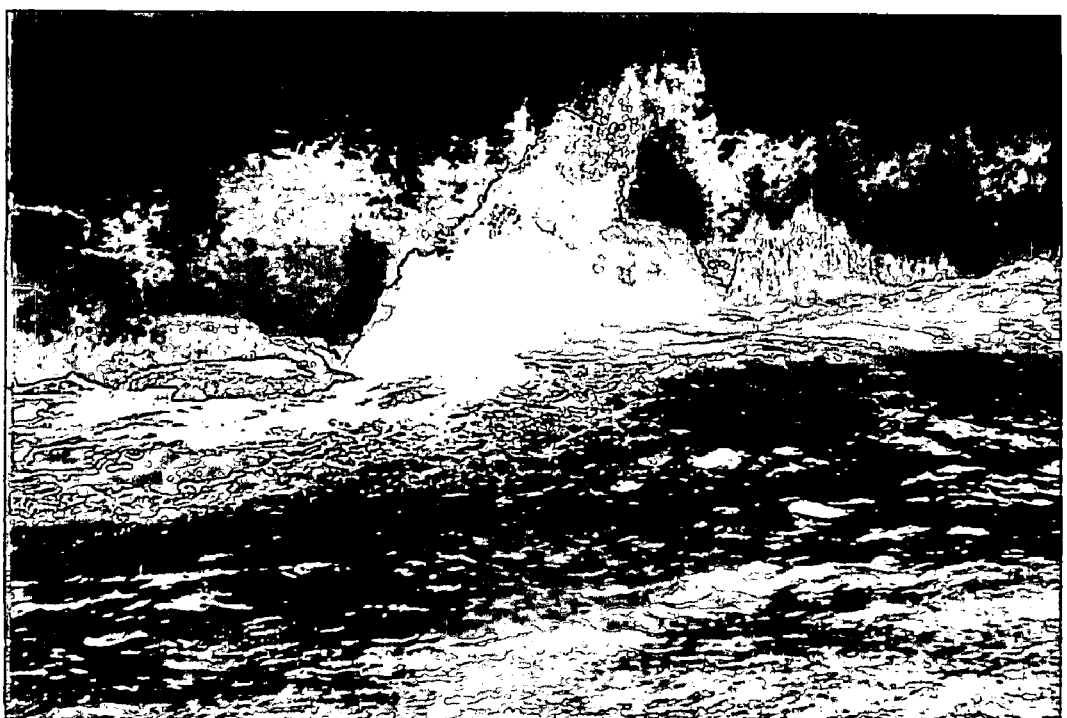
FIG. 52 is a digital photograph when adjusting the contrast of FIG. 51 to bring the brightness and contrast of the seawall close to the state of FIG. 50.
Figure 53:
FIG. 53 is a digital photograph prepared by clipping the seawall portion of FIG. 52 and pasting it over the corresponding portion of the digital image corresponding to the digital photograph 51.

Therefore, the darkness of the digital image (FIG. 49) was adjusted (by adjustment of gradation), the brightness of the seawall in particular was corrected to a state close to the digital image (FIG. 50), and the corrected digital image (FIG. 51) was displayed on the monitor (see Table 8 for content of gradation adjustment). The content of this gradation adjustment is shown in Table 8. If compared with the seawall of the digital image (FIG. 50), however, it was learned that the contrast between detailed elements of the seawall portion was weak, so the digital image (FIG. 51) was adjusted in brightness (+37) and contrast (+50) in that order and the resultant digital image (FIG. 52) displayed on the monitor. Next, the seawall portion of the digital image (FIG. 52) was clipped and pasted over the corresponding portion of the digital image (FIG. 51), and the difference at the boundary portion of the pasted seawall portion and the original portion of the digital image (FIG. 51) was removed by a known technique to prepare the desired digital image (FIG. 53).

TABLE 8

Figure 62:
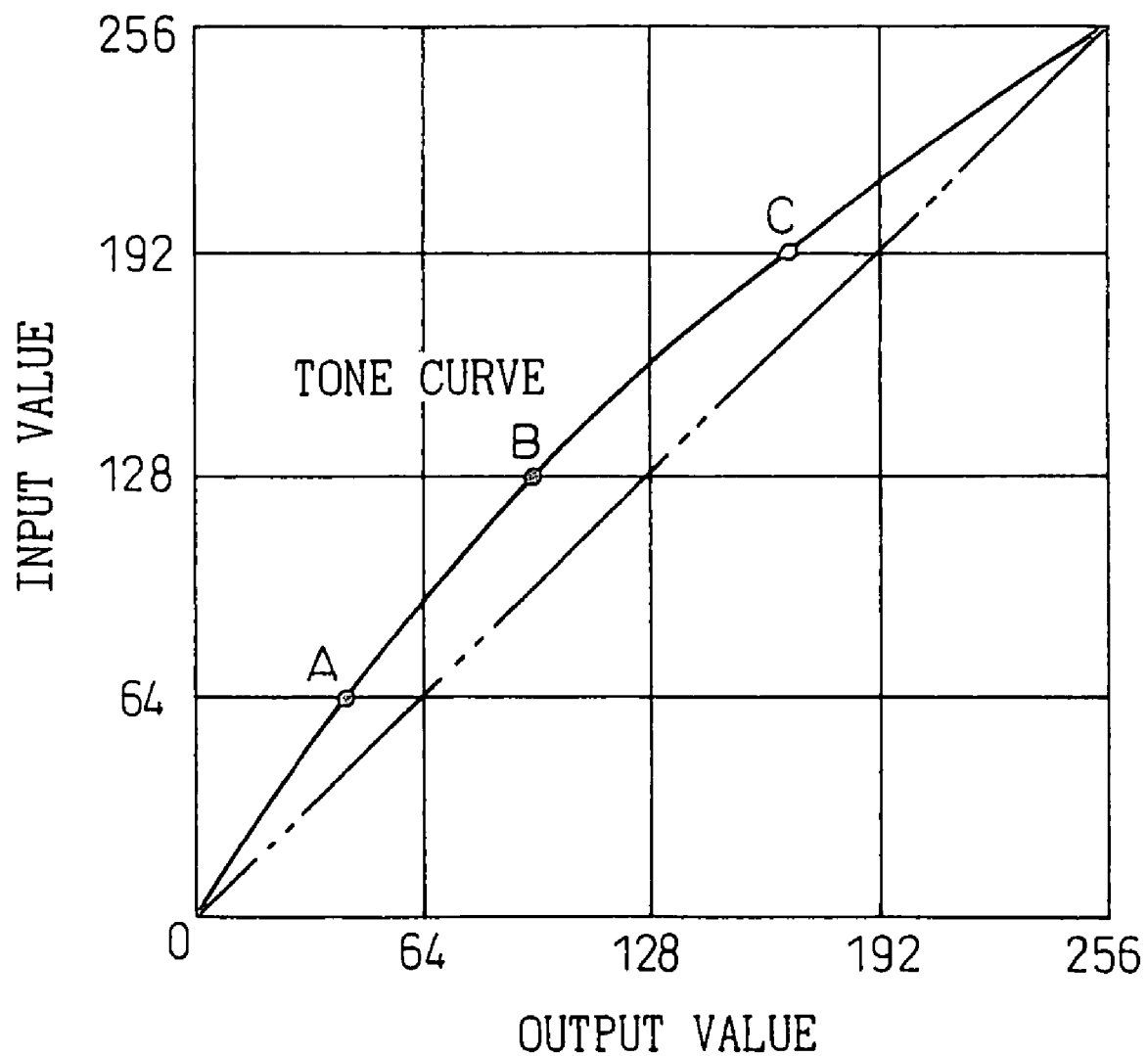
FIG. 62 is a reference view showing data of adjustment of gradation performed for adjusting the brightness and contrast of a digital image performed in the fourth experiment and Embodiments 1 and 2.

Input values (birhgtness of original digital images) and output values (adjusted brightness) of points A, B, and C shown in FIG. 62 (tone curves)

Figure 1:
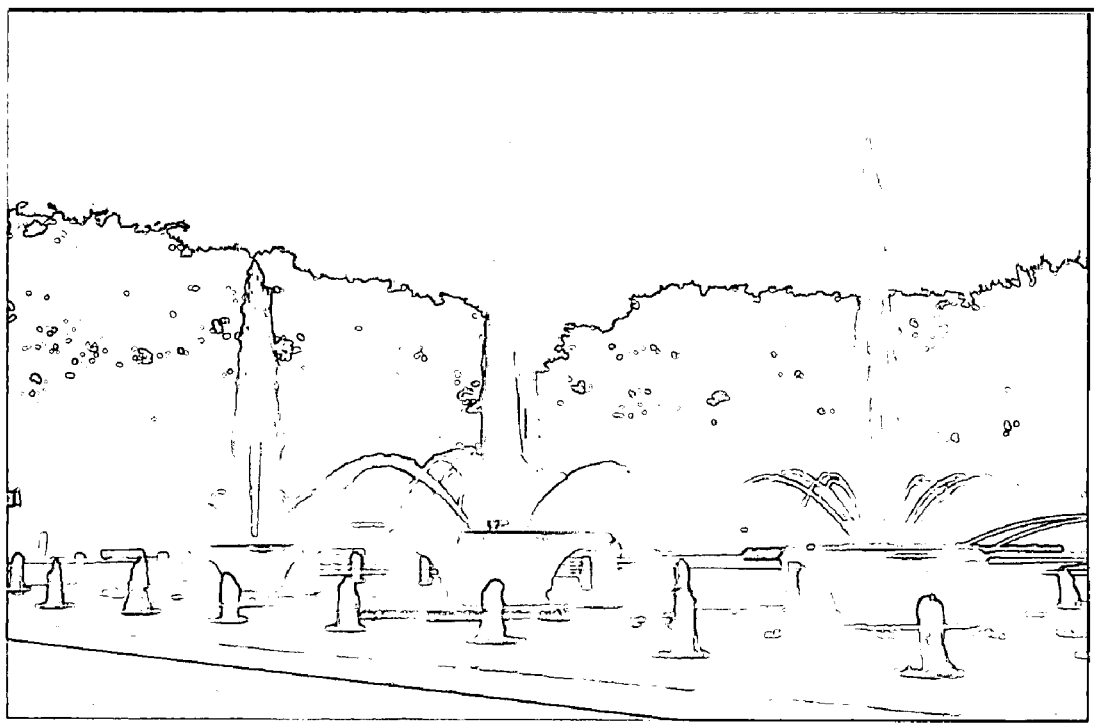
FIG. 1 is a digital photograph showing the results of an experiment of photographing as a subject a scene centered around fountains using a silver film camera at a shutter speed of $1/15$ second (Example 1).
Figure 2:
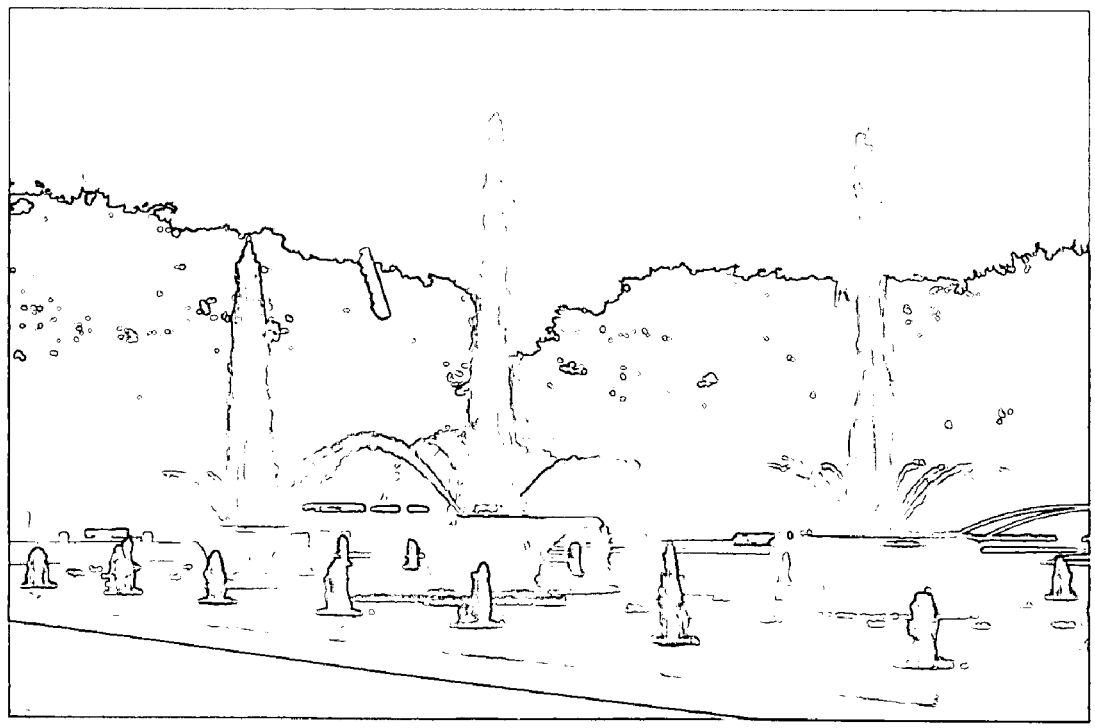
FIG. 2 is a digital photograph showing the results of an experiment of photographing the same subject at a shutter speed of $1/30$ second.
Figure 3:
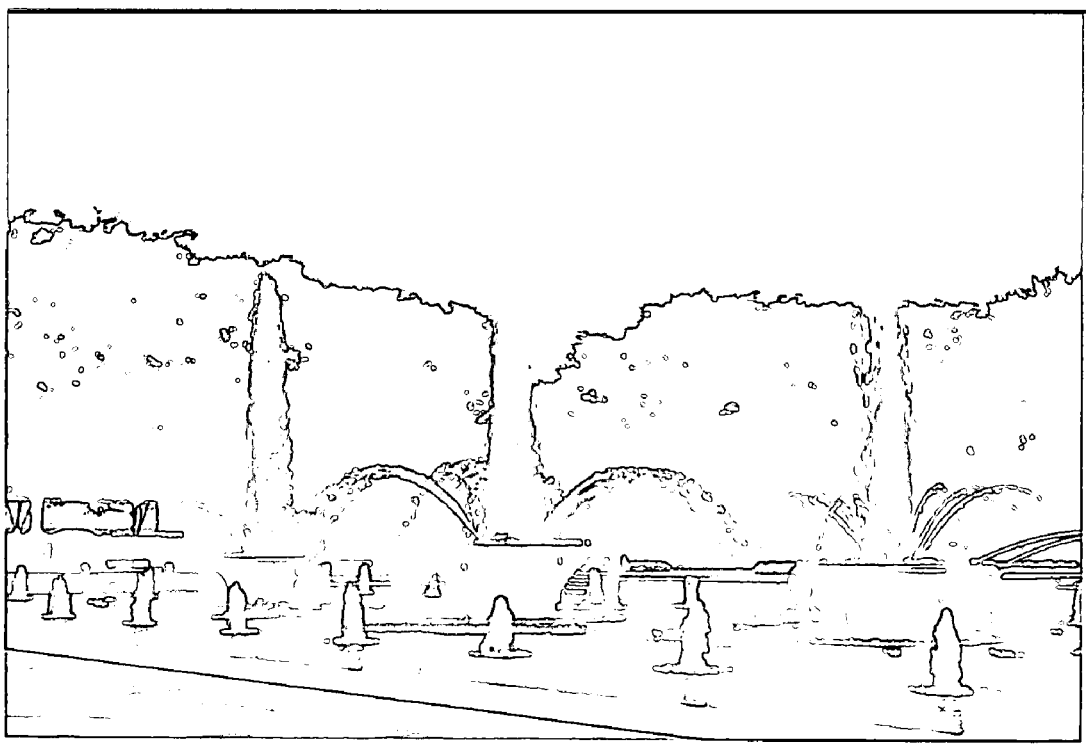
FIG. 3 is a digital photograph showing the results of an experiment of photographing the same subject at a shutter speed of 1/60 second.
Figure 4:
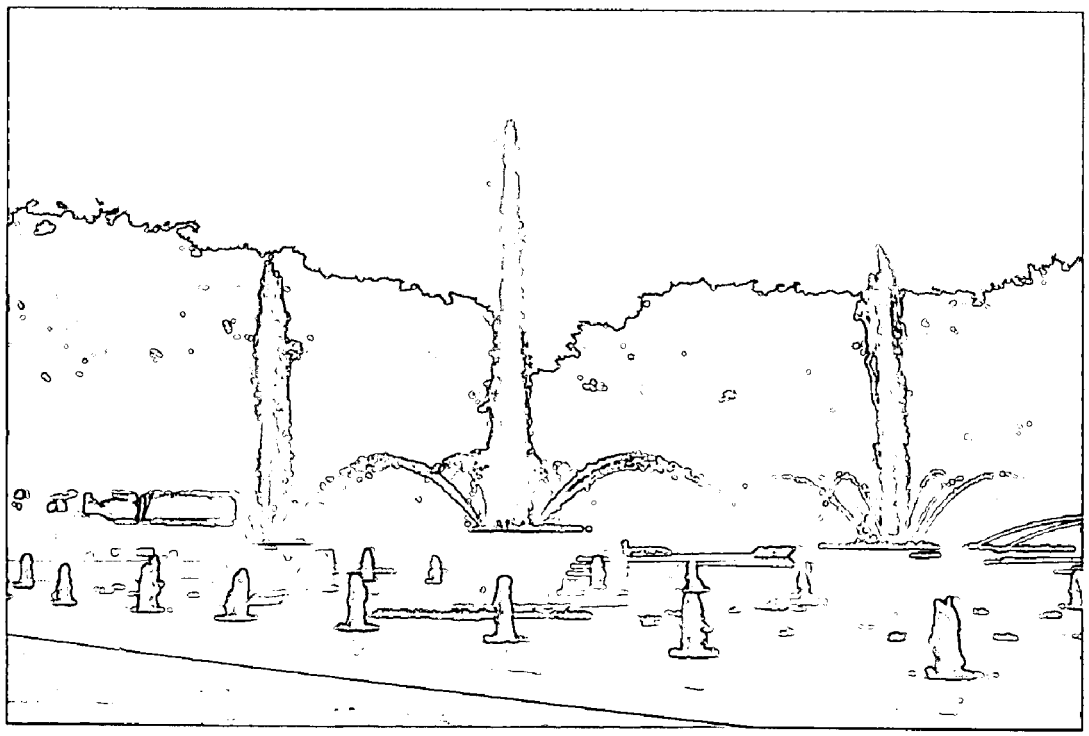
FIG. 4 is a digital photograph showing the results of an experiment of photographing the same subject at a shutter speed of 1/125 second.
Figure 5:
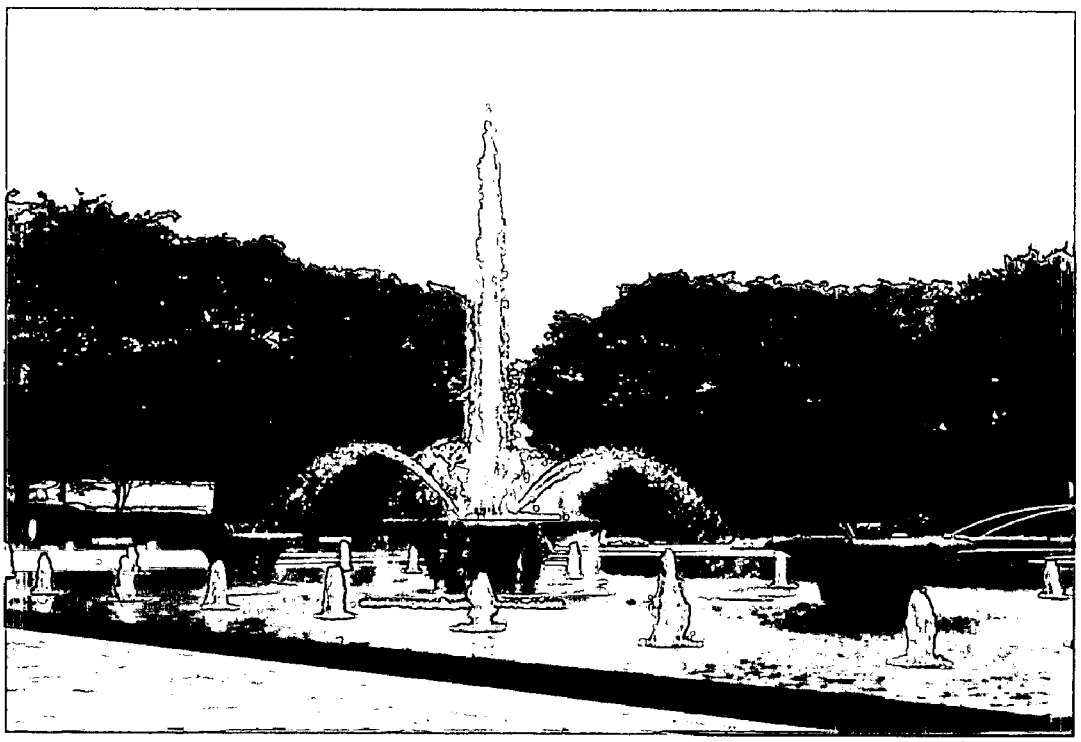
FIG. 5 is a digital photograph showing the results of an experiment of photographing the same subject at a shutter speed of 1/250 second.
Figure 6:
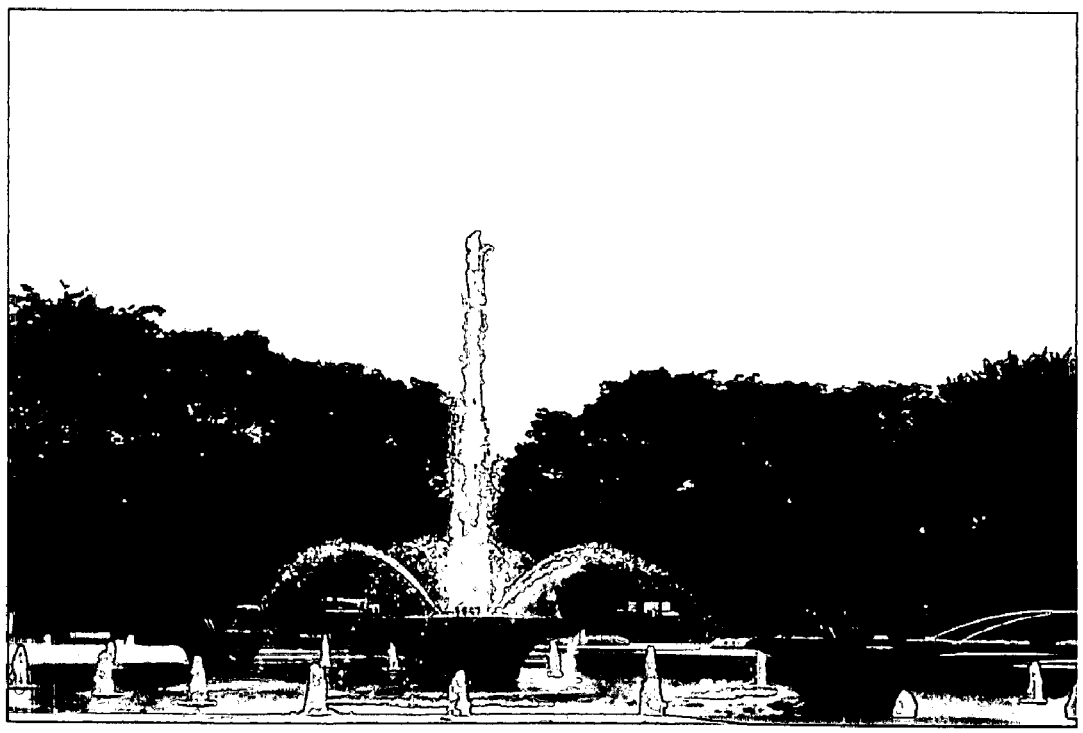
FIG. 6 is a digital photograph showing the results of an experiment of photographing the same subject at a shutter speed of 1/500 second.
Figure 7:
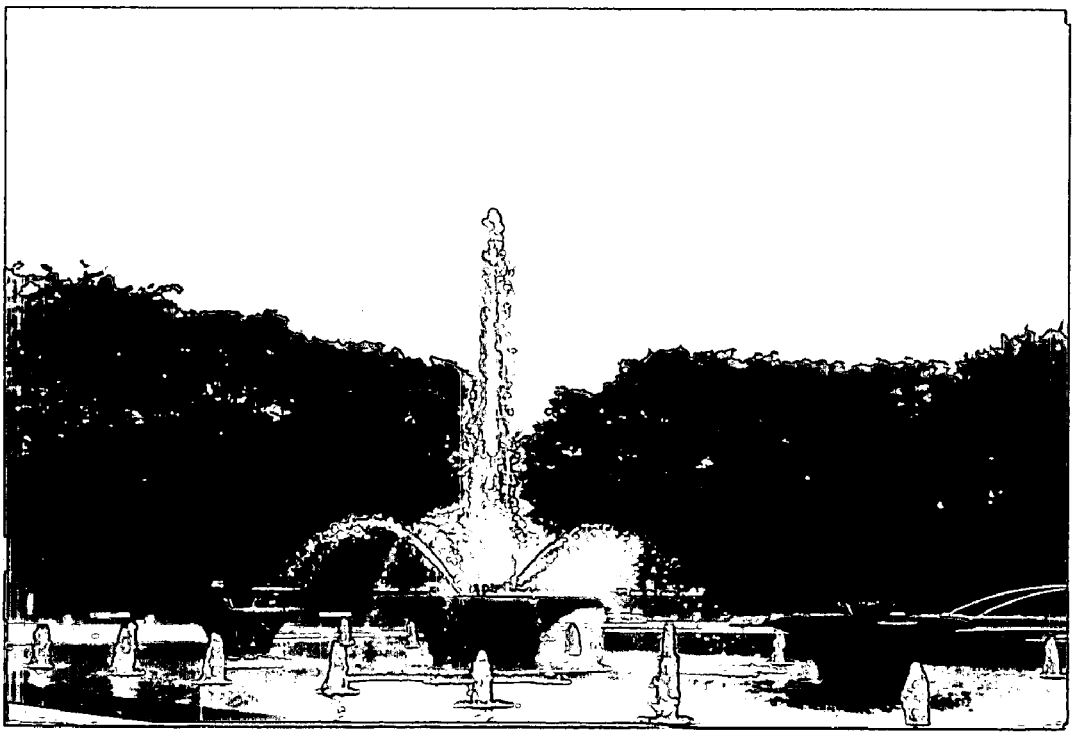
FIG. 7 is a digital photograph showing the results of an experiment of photographing the same subject at a shutter speed of 1/1000 second.
Figure 8:
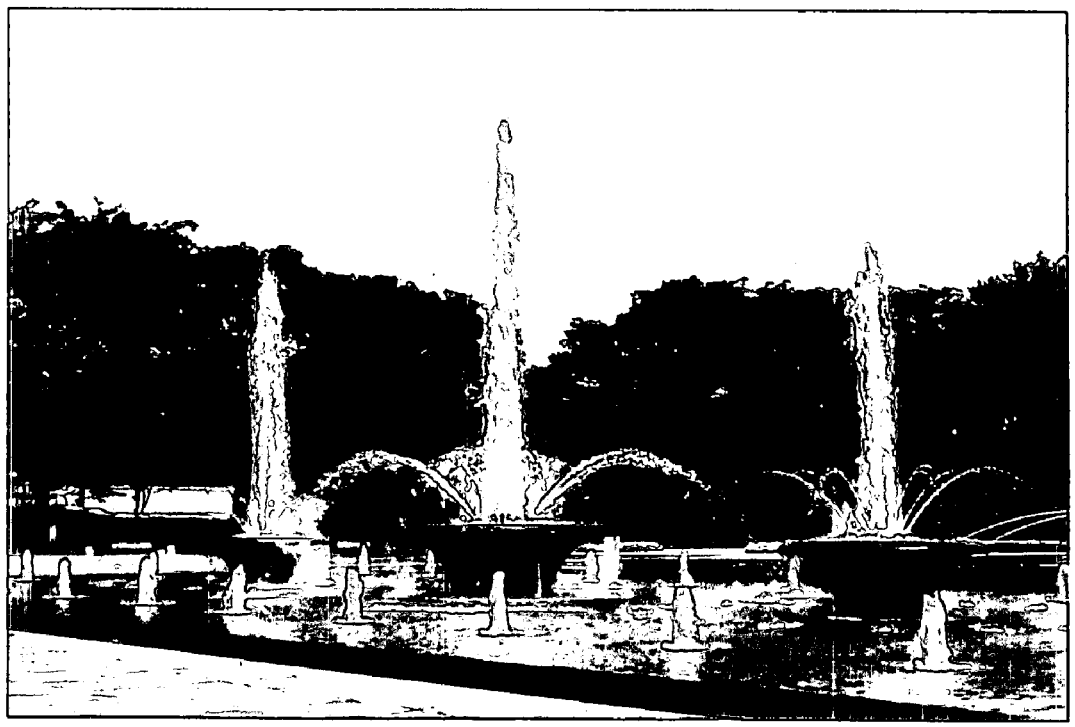
FIG. 8 is a digital photograph showing the results of an experiment of photographing the same subject at a shutter speed of 1/2000 second.
Figure 9:
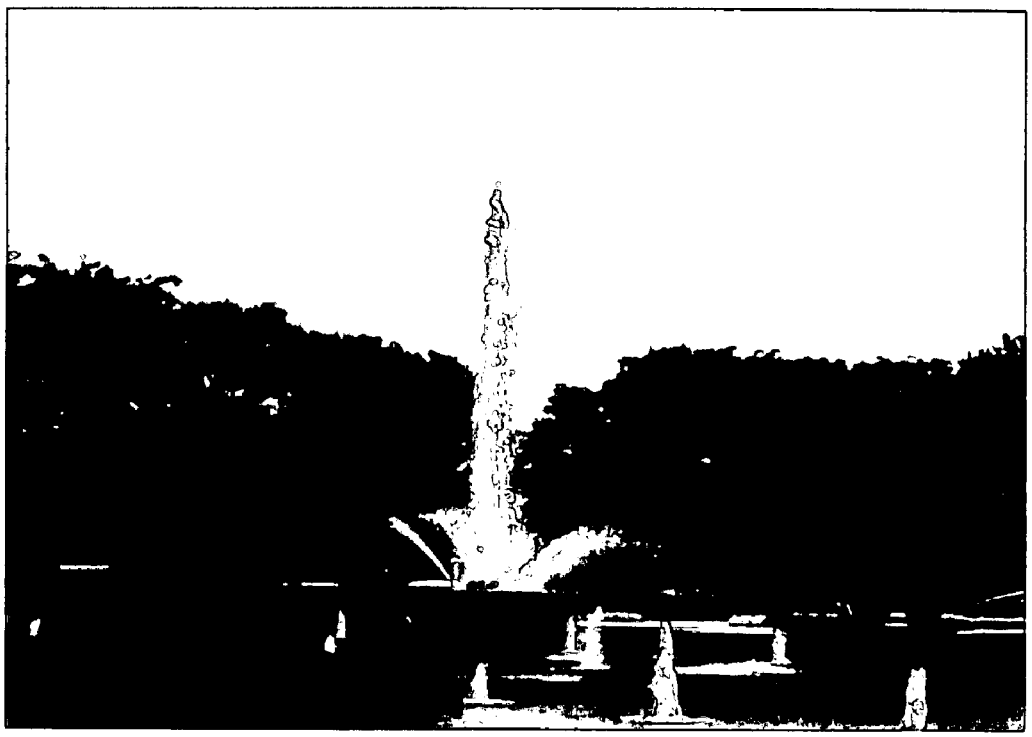
FIG. 9 is a digital photograph showing the results of an experiment of photographing the same subject at a shutter speed of 1/4000 second (first experiment).
Figure 10:
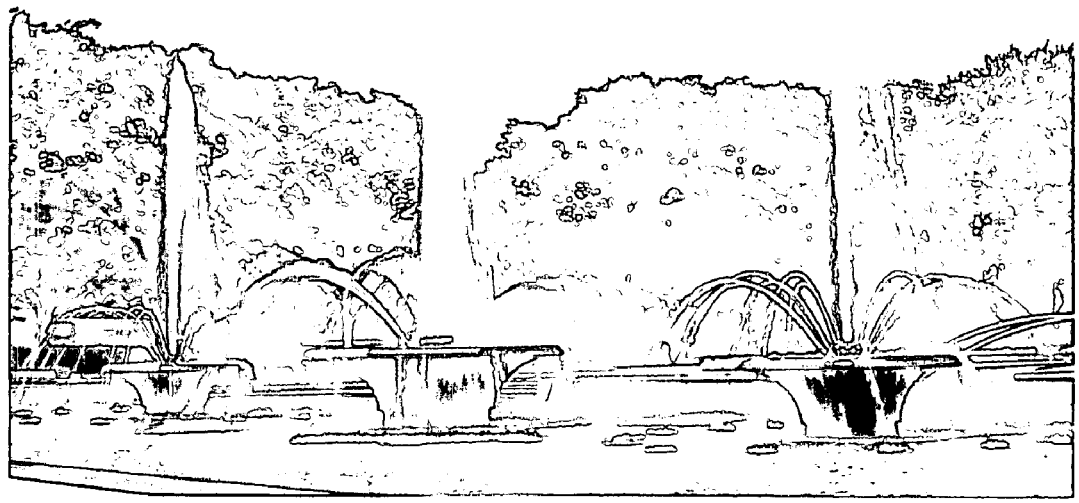
FIG. 10 is a digital photograph showing the results of an experiment of photographing the same subject as in FIG. 1 using a digital camera at a shutter speed of 1 second (second experiment).
Figure 11:
FIG. 11 is a digital photograph showing the results of an experiment of photographing the same subject at a shutter speed of 1/10 second (second experiment).
Figure 12:
FIG. 12 is a digital photograph showing the results of an experiment of photographing the same subject at a shutter speed of 1/20 second (second experiment).
Figure 13:
FIG. 13 is a digital photograph showing the results of an experiment of photographing the same subject at a shutter speed of 1/30 second (second experiment).
Figure 14:
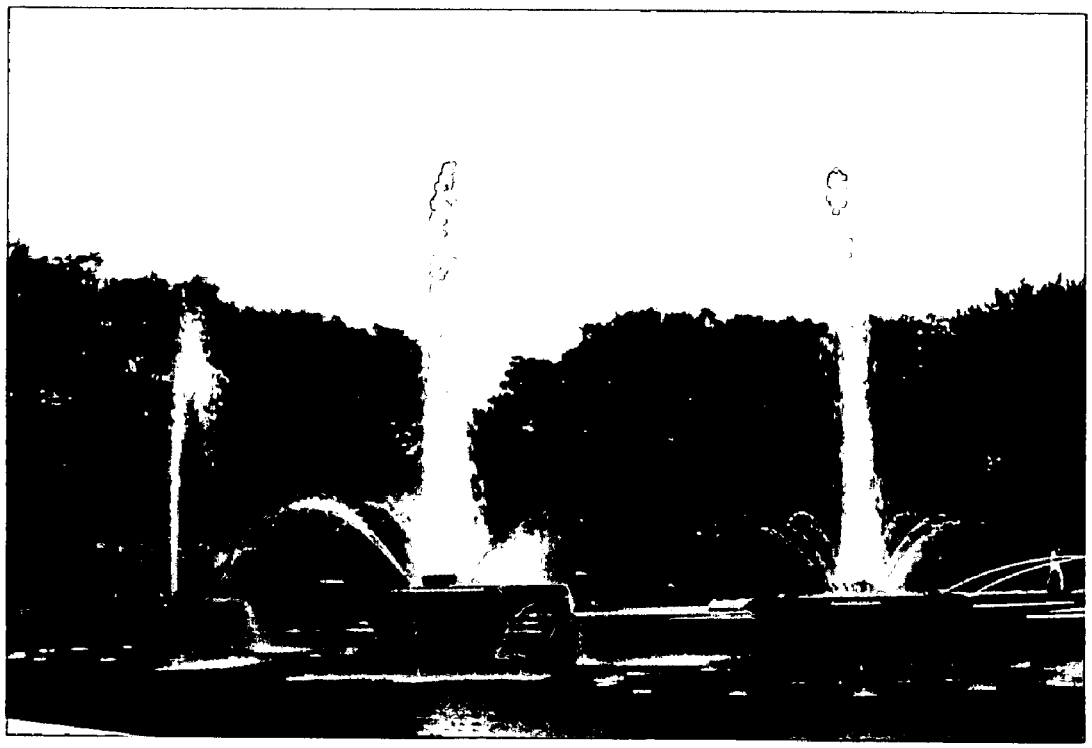
FIG. 14 is a digital photograph showing the results of an experiment of photographing the same subject at a shutter speed of 1/60 second (second experiment).
Figure 15:
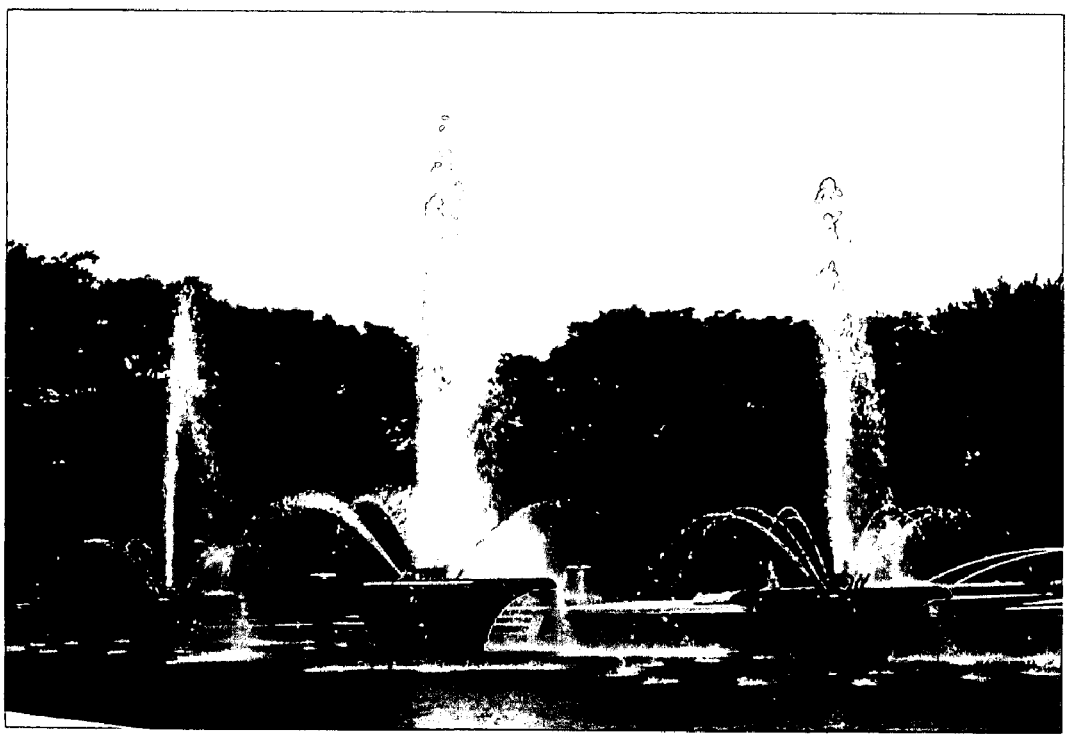
FIG. 15 is a digital photograph showing the results of an experiment of photographing the same subject at a shutter speed of 1/125 second (second experiment).
Figure 16:
FIG. 16 is a digital photograph showing the results of an experiment of photographing the same subject at a shutter speed of 1/250 second (second experiment).
Figure 17:
FIG. 17 is a digital photograph showing the results of an experiment of photographing the same subject at a shutter speed of 1/350 second (second experiment).
Figure 18:
FIG. 18 is a digital photograph showing the results of an experiment of photographing the same subject at a shutter speed of 1/500 second (second experiment).
Figure 19:
FIG. 19 is a digital photograph showing the results of an experiment of photographing the same subject at a shutter speed of 1/750 second (second experiment).
Figure 20:
FIG. 20 is a digital photograph showing the results of an experiment of photographing the same subject at a shutter speed of 1/1000 second (second experiment).
Figure 21:
FIG. 21 is a digital photograph showing the results of an experiment of photographing the same subject at a shutter speed of 1/2000 second (second experiment).
Figure 22:
FIG. 22 is a digital photograph showing the results of an experiment of photographing the same subject at a shutter speed of 1/3000 second (second experiment).
Figure 23:
FIG. 23 is a digital photograph showing the results of an experiment of photographing the same subject at a shutter speed of 1/4000 second (second experiment).
Figure 24:
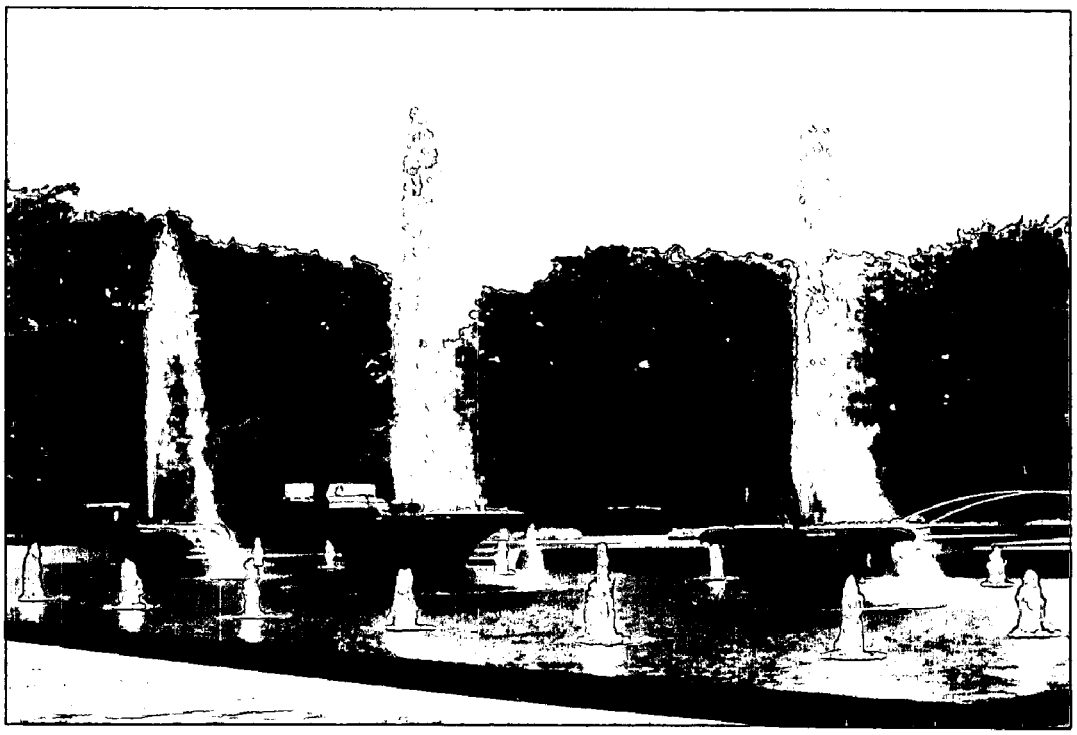
FIG. 24 is a digital photograph showing the results of an experiment photographing the same subject as in the first experiment using a digital camera, fixing the shutter speed to 1/500 second, and using an exposure compensation of −2 (third experiment).
Figure 25:
FIG. 25 is a digital photograph showing the results of an experiment photographing the same subject using an exposure compensation of −1 (third experiment).
Figure 26:
FIG. 26 is a digital photograph showing the results of an experiment photographing the same subject using an exposure compensation of ±0 (third experiment).
Figure 27:
FIG. 27 is a digital photograph showing the results of an experiment photographing the same subject using an exposure compensation of +1 (third experiment).
Figure 28:
FIG. 28 is a digital photograph showing an original digital image used as a comparative subject in the third experiment.
Figure 29:
FIG. 29 is a digital photograph showing an original digital image for digital processing performed in the third experiment.
Figure 30:
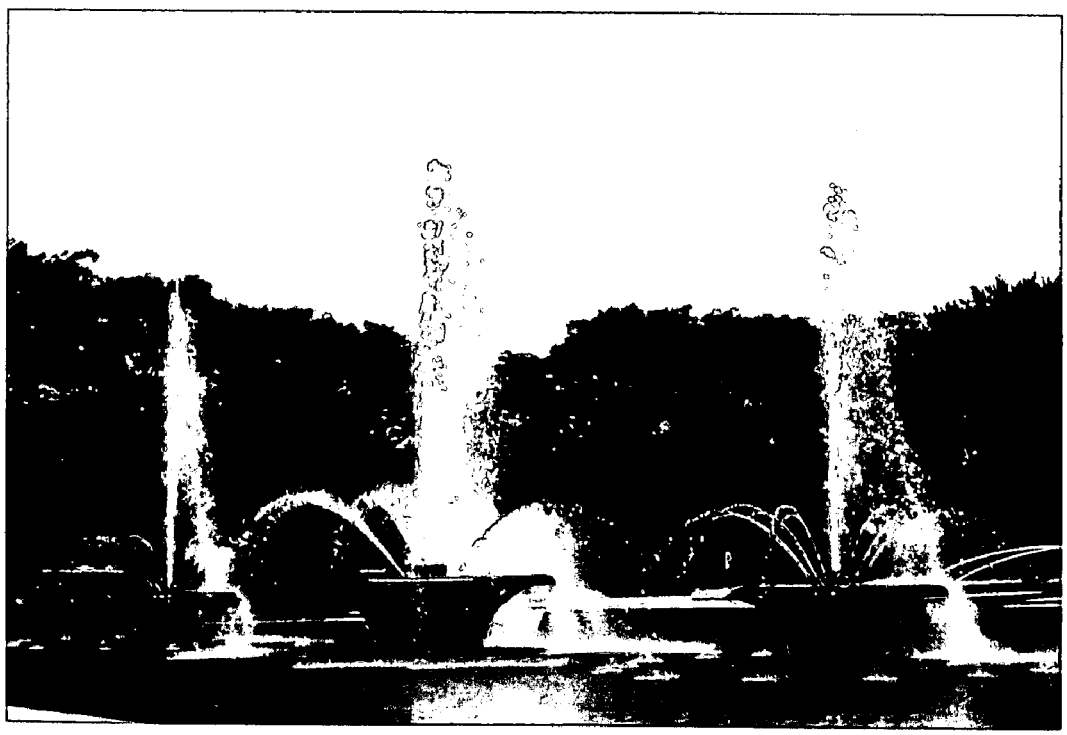
FIG. 30 is a digital photograph showing a digital image obtained by adjusting the brightness (+35) of the digital image of FIG. 29.
Figure 31:
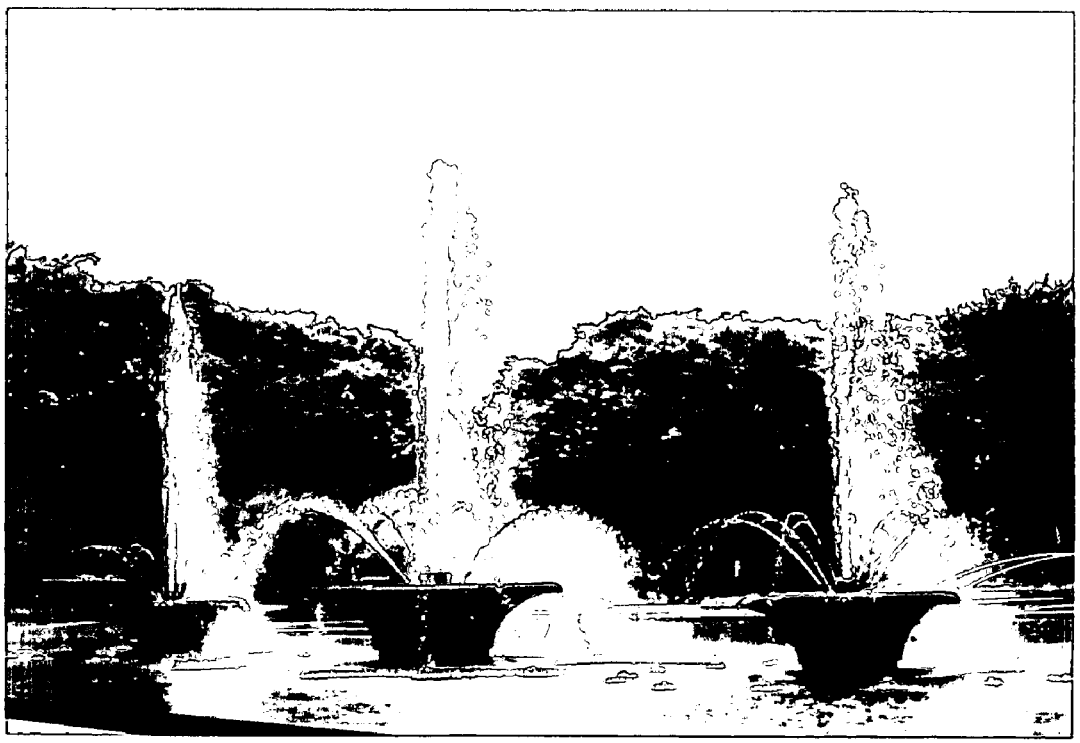
FIG. 31 is a digital photograph showing a digital image obtained by adjusting the contrast (+25) of the digital image of FIG. 30.
Figure 32:
FIG. 32 is a digital photograph showing a digital image obtained by adjusting the brightness (+30) of the digital image of FIG. 29.
Figure 33:
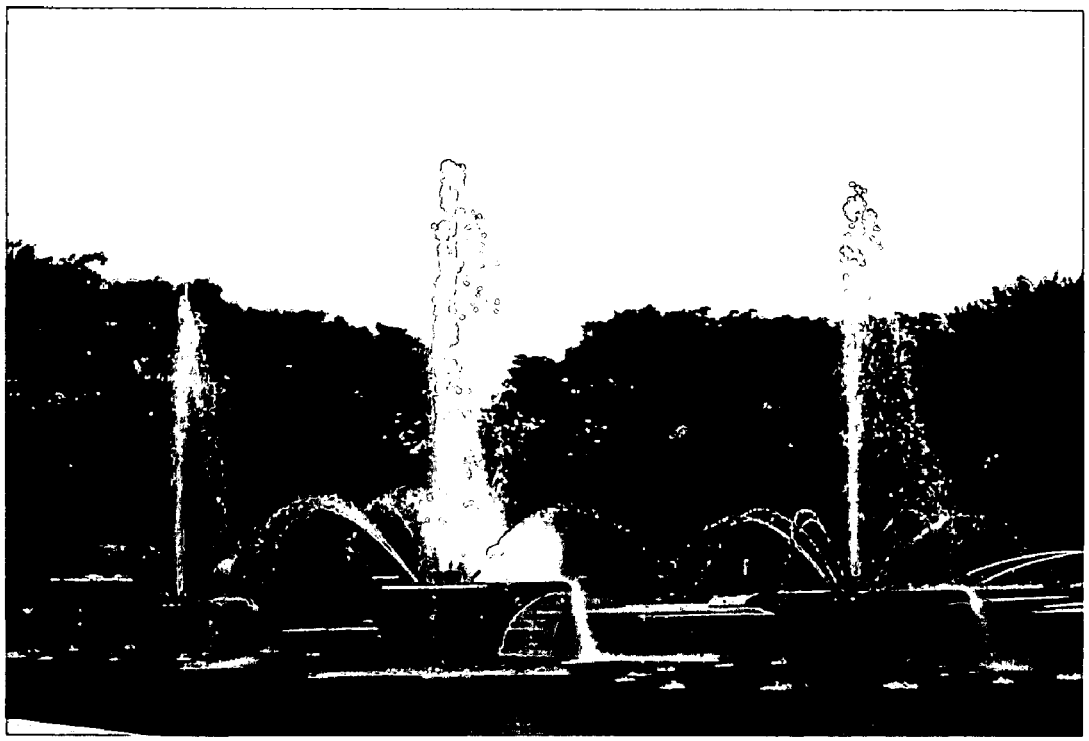
FIG. 33 is a digital photograph showing a digital image obtained by adjusting the contrast (+19) of the digital image of FIG. 32.
Figure 34:
FIG. 34 is a digital photograph showing a digital image obtained by adjusting the brightness (+50) of the digital image of FIG. 33.
Figure 35:
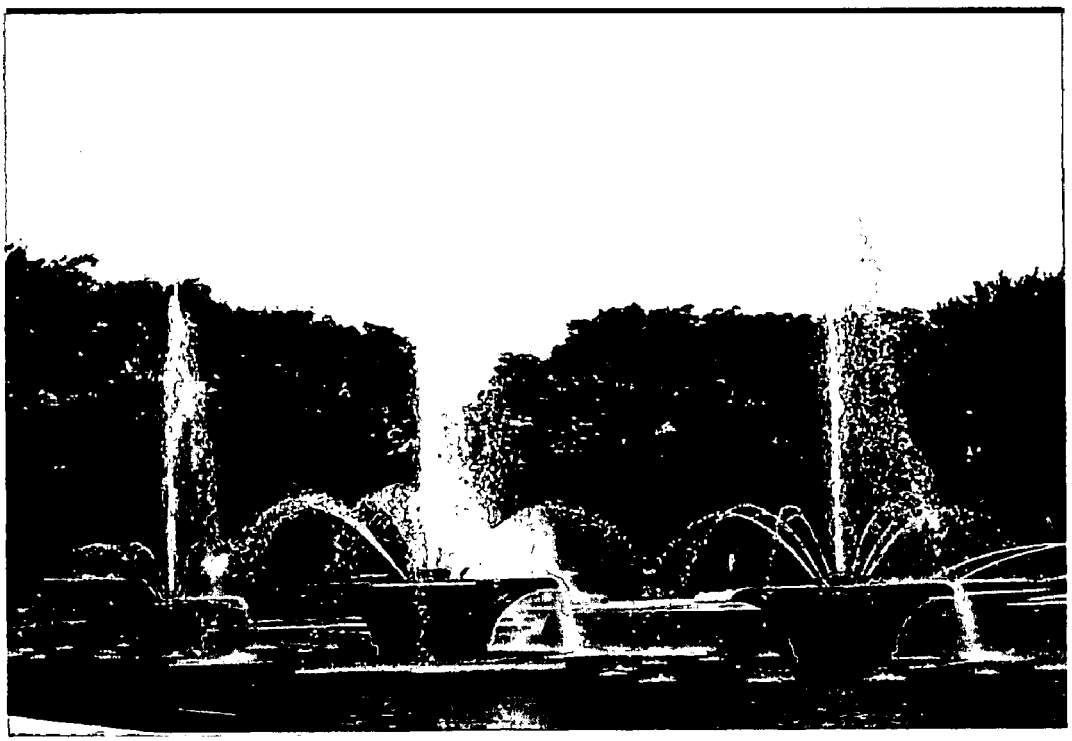
FIG. 35 is a digital photograph showing a digital image obtained by adjusting the contrast (+22) of the digital image of FIG. 34.
Figure 36:
FIG. 36 is a digital photograph showing a digital image obtained by adjusting the gradation of the digital image of FIG. 29.
Figure 37:
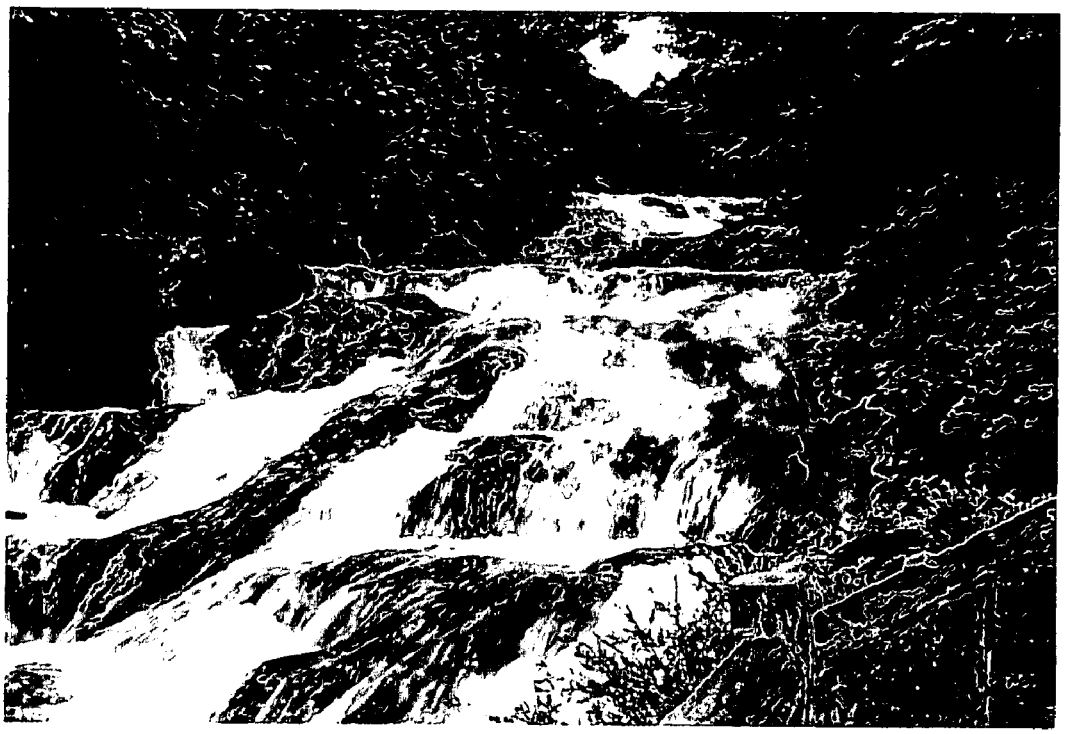
FIG. 37 is a digital photograph of the case of photographing as a subject a gully positioned immediately upstream of the Ryuzu Falls in Nikko, Japan setting the shutter speed to 1/30 second in a series of experiments conducted using that subject.
Figure 38:
FIG. 38 is a digital photograph of the case of photographing the same subject setting the shutter speed to 1/125 second.
Figure 39:
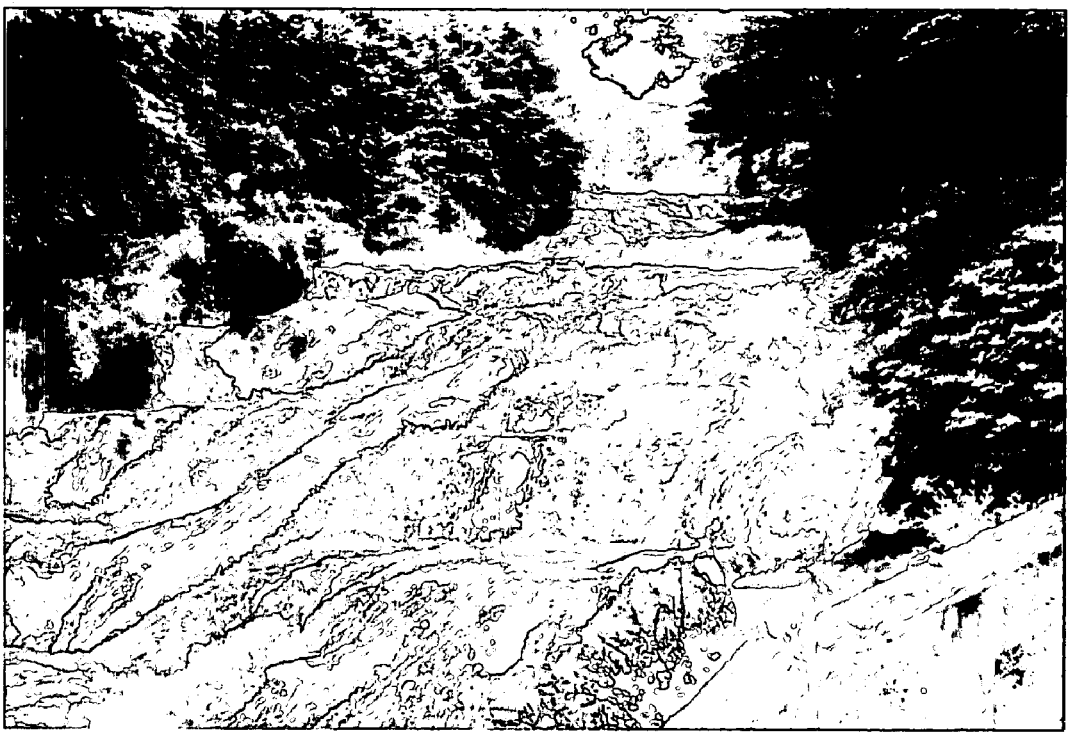
FIG. 39 is a digital photograph of the case of photographing the same subject setting the shutter speed to 1/250 second.
Figure 40:
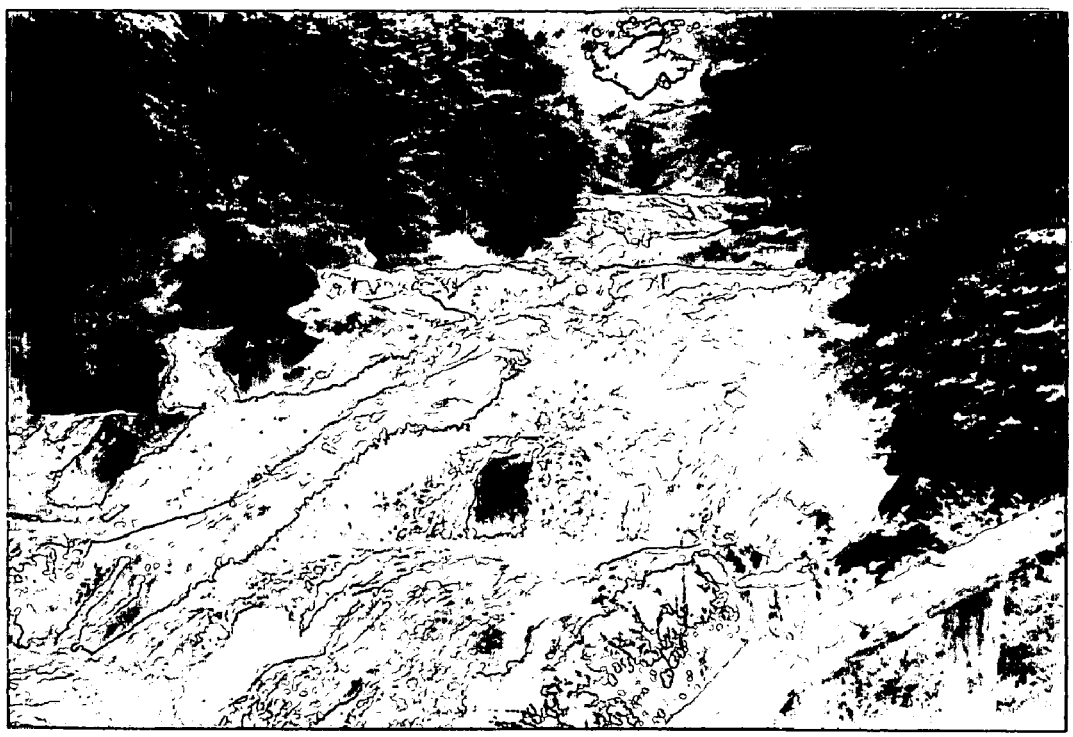
FIG. 40 is a digital photograph of the case of photographing the same subject setting the shutter speed to 1/750 second.
Figure 41:
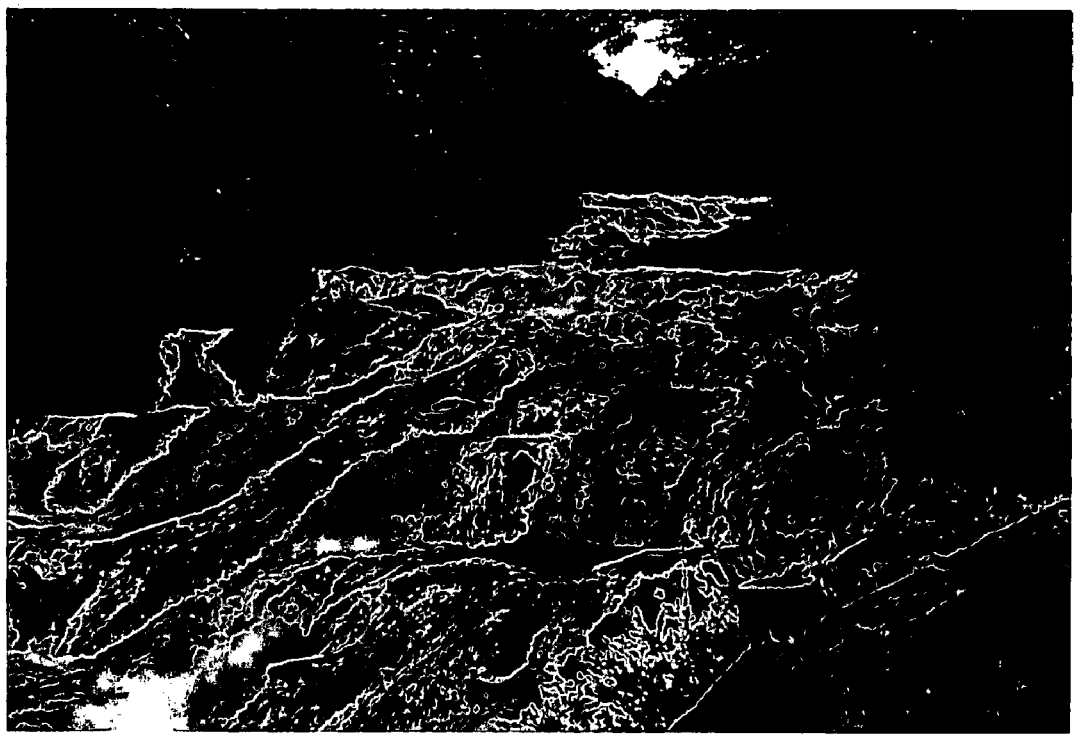
FIG. 41 is a digital photograph of the case of photographing the same subject setting the shutter speed to 1/2000 second.
Figure 51:
FIG. 51 is a digital photograph obtained by adjusting the digital image of FIG. 49 in gradation to bring it close to the brightness of the seawall in FIG. 50.

| FIG. No. | Point A | | Point B | | Point C | |
|---|---|---|---|---|---|---|
| | Input value | Output value | Input value | Output value | Input value | Output value |
| FIG. 36 | 64 | 36 | 128 | 79 | 192 | 143 |
| FIG. 46 | 64 | 47 | 128 | 102 | 192 | 170 |
| FIG. 51 | 64 | 18 | 128 | 38 | 192 | 83 |

Figure 54:
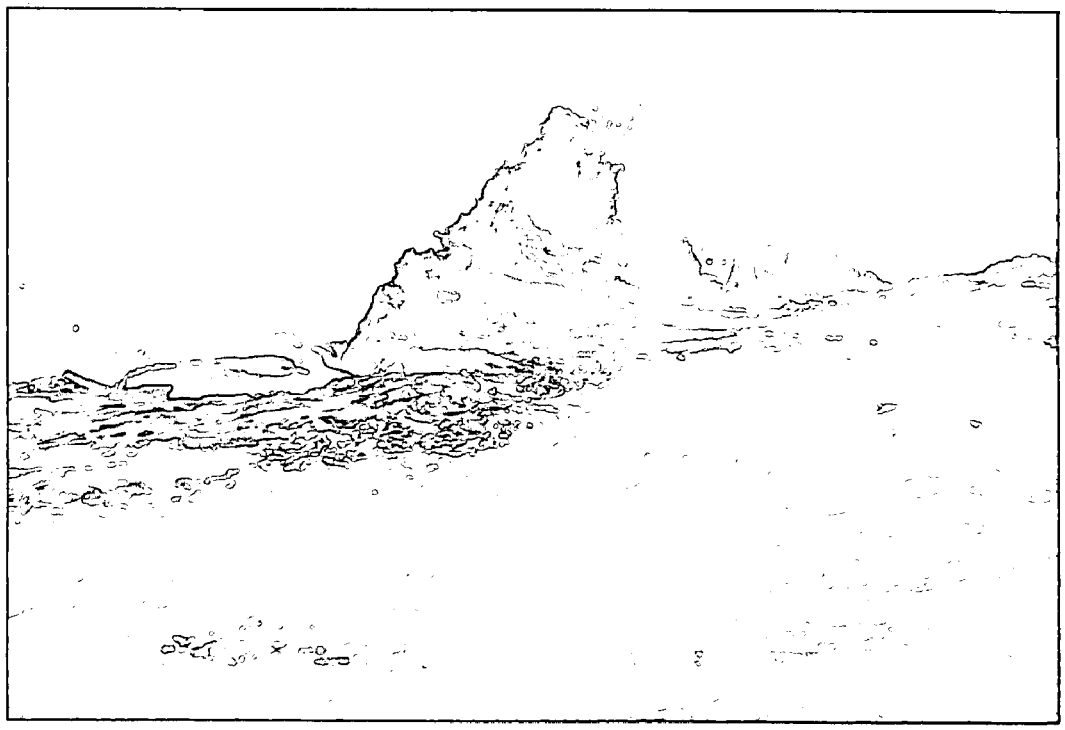
FIG. 54 is a digital photograph prepared by adjusting the brightness (+55) of a digital image corresponding to the digital photograph FIG. 52 and then adjusting the contrast (+8).
Figure 55:
FIG. 55 is a digital photograph prepared by clipping the portion of the breaking waves of FIG. 54 and pasting it over the corresponding portion of the digital image corresponding to the digital photograph (FIG. 52).
Figure 56:
FIG. 56 is a digital photograph obtained by photographing of breaking waves from the Pacific Ocean at the Kamogawa seashore setting the shutter speed to 1/125 second.
Figure 57:
FIG. 57 is a digital photograph of the case of photographing the same subject setting the shutter speed to 1/800 second.
Figure 58:
FIG. 58 is a digital photograph of the case of photographing the same subject setting the shutter speed to 1/1000 second.
Figure 59:
FIG. 59 is a digital photograph of the case of photographing the same subject setting the shutter speed to 1/5000 second.
Figure 60:
FIG. 60 is a digital photograph of the case of photographing the same subject setting the shutter speed to 1/1600 second.

In addition to the above image processing, it is possible to produce a desired digital image by the following technique. It is possible to first use the above digital image processing to display a digital image (FIG. 52) on the monitor, then adjust the brightness of the digital image (FIG. 49) to make it brighter (+55), then adjust the contrast (+8) to thereby display another digital image (FIG. 54) on the monitor, clip the portion of the waves of the digital image (FIG. 54) and paste it over the corresponding portion of the digital image (FIG. 52), then remove the difference of the boundary portion between the pasted wave portion and the original portion of the digital image (FIG. 52) by a known technique (for example, using a stamp tool) to display the desired digital image (FIG. 55) on the monitor.

The digital image processing work in the above mentioned embodiments includes storing the digital data of the digital image displayed on the monitor of the image processing system 1 in an MO disk by an MO drive, using this MO disk to store the data in the computer G3 through the MO drive of the image processing system 2, displaying the data as a digital image (FIG. 50) on the monitor of the system, and performing the above-mentioned image processing work and printing work on the digital image. Further, the change in color occurring when transferring digital data from the image processing system 1 to the image processing system 2 is of course corrected by a known calibration technique.

Fourth Embodiment

This embodiment is an experiment of photographing rough waves of the Pacific Ocean breaking against the seashore at Kamogawa, Boso, Japan under the following conditions using a Nikon Dix (ISO sensitivity: 400):

That is, the shutter speed was set to 11 stages of shutter speeds in the range of 1/30 second to 1/16000 second (1/16000, 1/10000, 1/8000, 1/5000, 1/3200, 1/1000, 1/800, 1/200, 1/125, 1/60, and 1/30 seconds) and the photographs taken by priority to shutter speed. Note that as clear from the description in the specifications of this camera, when the shutter speed is from 1/6000 second to 1/30 second, the diaphragm is automatically adjusted and the photo taken at the suitable exposure, so the photographs were taken with this function in mind.

In the same way as the experiments of Embodiments 1 to 3, digital data was stored in the computer G4 of the image processing system 1 from a CF card and stored by an MO drive into an MO disk and then the computer G3 of the digital image processing system 2. The comparative study of the digital images displayed on the monitor gave similar experimental results as in Embodiments 1 to 3. To avoid duplication in explanation, the results obtained in particular in this experiment will be explained with reference to the digital photographs taken at shutter speeds of 1/125 second, 1/800 second, 1/1000 second, 1/5000 second, and 1/16000 second. Further, when the shutter speed exceeds a certain limit, specifically 1/6000 second, the photographed image as a whole becomes extremely dark. With this as it is, the image is unsuitable as material, so known computer image processing is used to correct the brightness (by adjustment of the brightness and then contrast) to produce the digital images (FIG. 56, FIG. 57, FIG. 58, FIG. 59, and FIG. 60) and use these as materials for studying the experimental results.

As already explained (for example, explanation of Embodiment 1), if making the shutter speed one corresponding to the speed of change over time of the moving water element, the photograph as a whole becomes dark, but the contrast of the details comprising the moving water element becomes stronger. It is learned that this tendency becomes less the further higher the shutter speed. This fact was confirmed by the experiment of this example as well. That is, if the shutter speed exceeds 1/6000 second, the limit of suitable white valance is exceeded and the digital photograph as a whole becomes particularly dark, but if the shutter speed becomes 1/16000, it was possible to display on the monitor a digital image realistically capturing the dynamic waves striking and breaking apart at the shoals. Therefore, the digital image was processed to adjust its brightness (+30) and then contrast (+50) and the digital image of FIG. 60 was displayed on the monitor.

Figure 61:
FIG. 61 is a digital photograph prepared by adjusting the brightness to contrast of a digital image corresponding to FIG. 60 and further adjusting the rocky shoal portion by image processing.

The shoals at the center of this digital image (FIG. 60), however, are darker than the waves and uniformly blacked out, so the shoal portion of the digital image obtained by photographing the scene at a shutter speed of 1/125 second was clipped and pasted over the corresponding portion of the digital image (FIG. 60), then the sky portion was selected and corrected to make it brighter by a known technique (brightness +12), the trimming was changed, and further the aspect ratio of the image was changed to be able to produce the digital image shown in FIG. 61. Further, it was possible to produce a digital image having color unique to the inventor (brightness, contrast, chroma, and color balance) by adjusting the chroma of the digital image of FIG. 61 and the color balance between elements forming the image.

From the above results, it was learned also that except when producing a digital image particularly stressing the waves striking and breaking apart at the shoals (FIG. 61), it is possible to take a sufficiently realistic digital photograph of waves even at $1/500$ second and that when taking a photograph stressing the waves striking and breaking apart at the shoals, trouble and time are taken for post processing (computer image processing) to obtain a photograph realistically showing the contrast over the details of that portion, but taking the photo at a shutter speed of $1/16000$ is desirable. However, the brightness of the sky portion and shoal portion has to be digitally processed to further correct it to a state close to the digital image taken under standard photographic conditions (shutter speed of $1/125$ second).

From this result, it was confirmed again that, leaving aside special cases where it is intended to particularly stress rhythmical waves striking and breaking apart at the shoals, the desired realistic digital photograph can be taken by selecting a shutter speed corresponding to the speed of change over time of the moving waves, that is, at the slowest $1/500$ second.

Above, the basic technical idea of the present invention was specifically clarified by the explanation of Embodiments 1 to 4. It was confirmed from the experiments of these embodiments that, if the shutter speed is made high, inevitably the photographic result changes to one of insufficient exposure and that the darker the photographic image, the more trouble is taken for the computer image processing. On the other hand, along with the rapid spread of and advances in digital photographs, the functions of digital cameras have greatly progressed in these past few years. Since photographic equipment enabling not only the shutter speed, but even the ISO sensitivity to be set to 1600, such as the Canon D30, Canon E-1, and other digital cameras used in the above experimental examples are being sold commercially, so the inventor conducted the following photographic experiment and conducted the following test of computer image processing of a digital image obtained by this photographing as the original image for the purpose of investigating the effect of increasing the ISO sensitivity of the digital camera.

Fifth Embodiment

This embodiment shows the results when using as an original photograph a digital photograph taken of the Oirase Stream of the Towada National Park (turbulent flow) using the above-mentioned Canon D30 digital camera at three levels of ISO sensitivity of 400, 800, and 1600 and progressive shutter speeds of $1/125$ second to $1/2000$ second.

Next, to avoid overlap in explanation, the explanation will be given focusing on the problems while referring to Table 9 and FIG. 63 to FIG. 69.

TABLE 9

Figure 63:
FIG. 63, FIG. 64, FIG. 65, FIG. 66, FIG. 67, FIG. 68 and FIG. 69 are reference drawings according to the Embodiment 5 showing the effects of a change in the ISO sensitivity setting of the digital camera used.

| FIG. No. | ISO | Shutter speed (sec) | Diaphragm | Exposure compensation | Remarks |
|---|---|---|---|---|---|
| 63 | 400 | $1/125$ | 8.0 | −1 | |
| 64 | 400 | $1/500$ | 4.0 | −1 | |
| 65 | | | | | FIG. 63 color corrected |
| 66 | 800 | $1/500$ | 4.0 | ±0 | |
| 67 | 800 | $1/125$ | 6.7 | ±0 | |
| 68 | 800 | $1/1000$ | 4.0 | −1 | |

TABLE 9-continued

Figure 67:

| FIG. No. | ISO | Shutter speed (sec) | Diaphragm | Exposure compensation | Remarks |
|---|---|---|---|---|---|
| 69 | | | | | FIG. 67 color corrected |

Note: In the shutter priority photography, the shutter speed and exposure compensations were changed, but the diaphragm was automatically adjusted and is entered here for reference.

Figure 66:
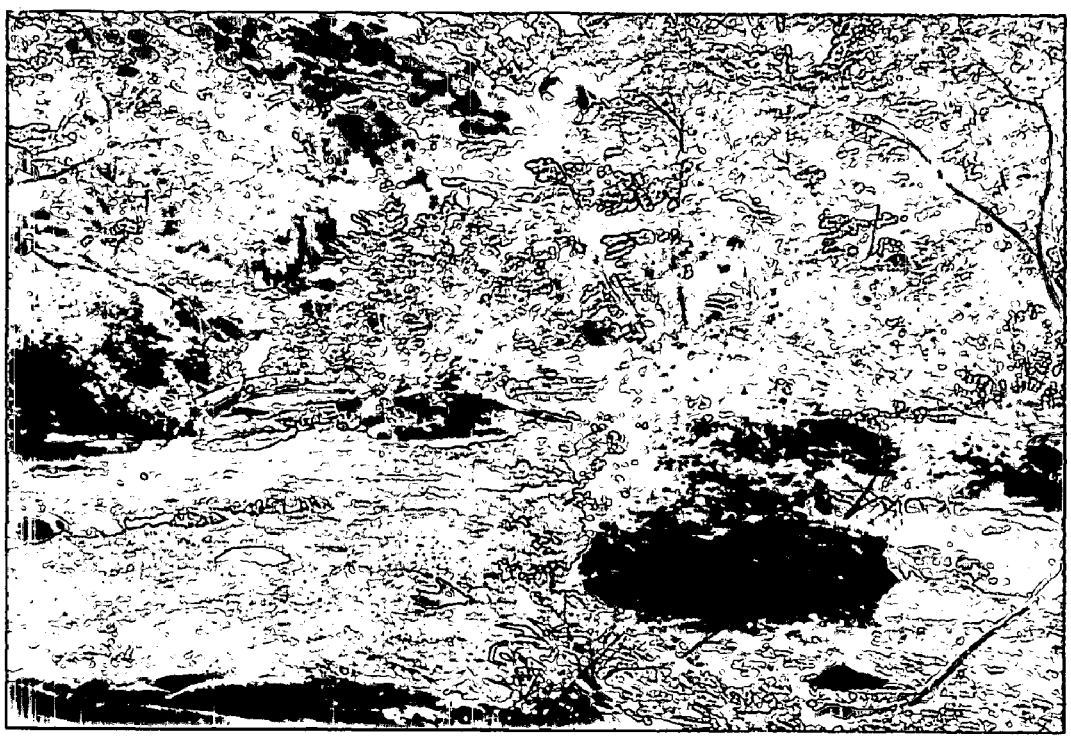

(1) The faster the shutter speed, only naturally, the darker the photographic image. However, since the ISO sensitivity was set high, the darkness of the photographic image became lighter in compared with the lower setting of ISO sensitivity, further, the change in the darkness of the photographic image became weaker. In the case of FIG. 66, results extremely close to the visual perception are obtained. However, it was necessary to finely correct the color balance between the trees of still elements forming the photographic image and the flowing water by image processing.

(2) As mentioned above, if ISO sensitivity is set high, the quality problem of the photographic image due to the darkness is mitigated in compared with the case of setting ISO sensitivity lower. On the other hand, since another problem due to the possible damage to the photographic image of the water stream by halation must be prevented, it is required to carefully select the high ISO sensitivity in the relation to the shutter speed together with the exposure compensation.

Figure 64:
Figure 65:
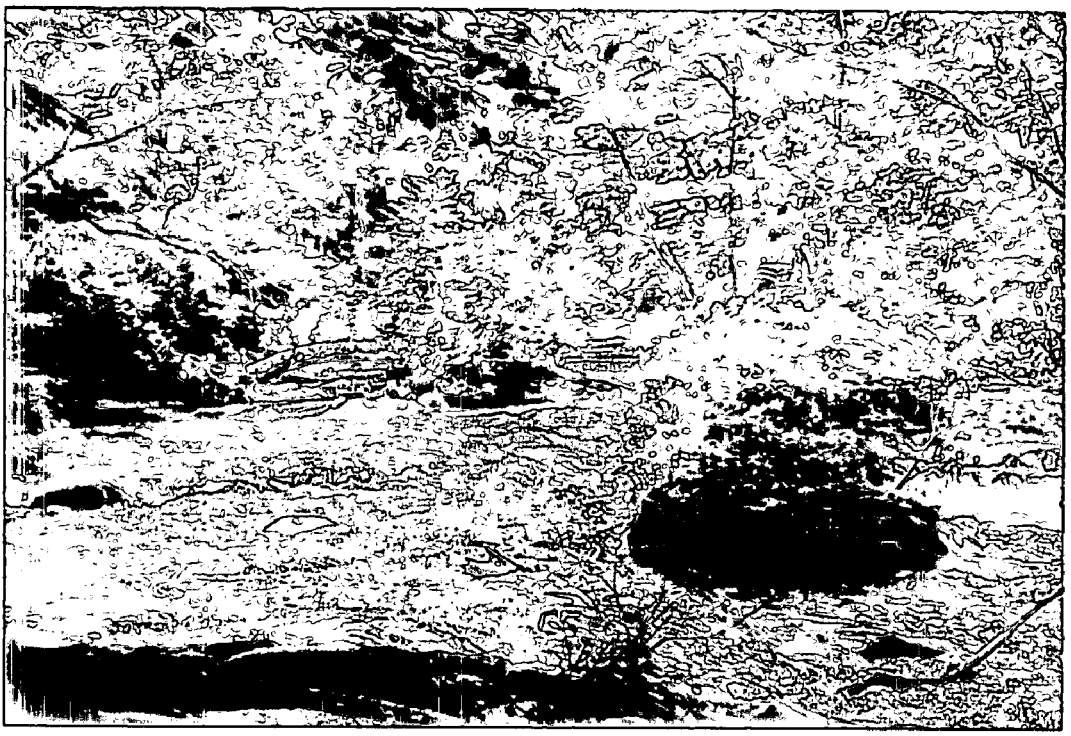
Figure 68:
Figure 69:
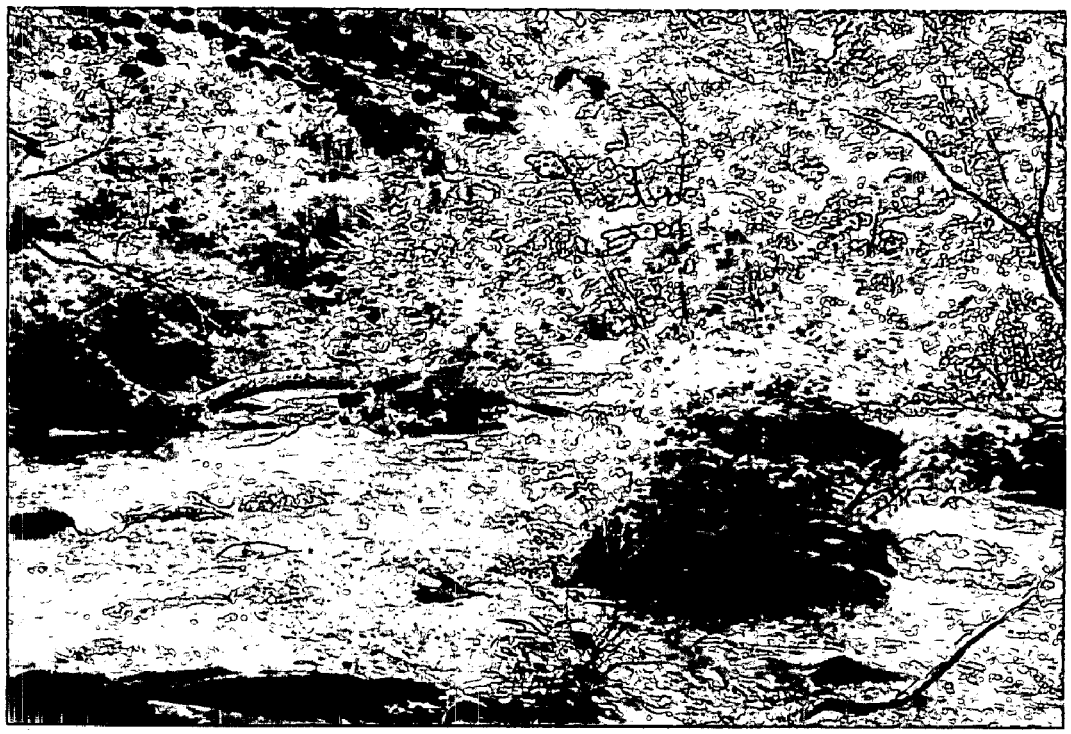

(3) Further, even when the original photograph differs from the case of FIG. 66 (FIG. 64, FIG. 68), as clear from Embodiments 1 to 4, it was confirmed that it is possible to correct it to a digital image (FIG. 64 and FIG. 68) being similar to FIG. 66, by computer image processing (FIG. 64 and FIG. 68).

(4) When using FIG. 66 (ISO sensitivity of 800, shutter speed of $1/500$ second) as the original photograph, the image processing makes finer adjustments compared with other cases, so the shutter speed is preferably set high. Note that in a photographic experiment using an ISO sensitivity of 1600, the exposure correction value is set excessively to one side, so the color level of the photographic image as a whole becomes extremely dark in level, excess time is required for the computer image processing, and in extreme cases the limits of image processing are exceeded. Fortunately, with digital cameras now on the market, the digital image can be visually checked on the monitor screen of the camera even right after being taken, so this sort of failure can be avoided by such a check. Therefore, in practice, it is clear that it is preferable to first take a preliminary photograph under standard photographic conditions such as program photograph, confirm by the monitor screen of the camera the ISO sensitivity of an extent where no halation occurs in the flowing water and other moving elements making up the digital image in relation with the speed of flow of the flowing water, then select the ISO sensitivity and, while in relation with the speed of flow of the flowing water as well, take the photograph at a high shutter speed of at least $1/350$ second.

From the above-mentioned explanation relying upon the preliminary Experiments 1-4 and the experiments disclosed in the embodiments 1-5, it was confirmed that so-called high shutter speed corresponding to the variation speed (or velocity) of the moving water element is the key to making a digital photograph as a realistic photographic image, instead of the traditional slow shutter speed.

However, even if the shutter speed is set appropriately, it is still impossible to avoid the influence of the ISO sensitivity of the film used in the case of using a digital camera, the setting value of ISO sensitivity, diaphragm of lens, exposure compensation, weather conditions of the photographing location. However, it was confirmed that, if plural shutter speeds are selected by interpolation (see the explanation of Embodiment 1) under the consideration of the above-mentioned additional factors, and the most realistic photographic image is selected from the photographic images obtained by the above-mentioned photographing, it is possible to make a realistic digital photographic image, which can be accepted as a visual image, by modifying the brightness and contrast, or gradation by using the known computer image processing technology.

Further, the work for making the brightness of the digital image displayed on the monitor substantially match with the visual perception is only naturally affected by the subjectivity of the operator engaged in the image processing work. When it comes to the brightness of the image, as clear from the explanation of the fourth experiment and the series of embodiments, this is an issue involving the brightness and contrast. Along with other color elements (color balance), while a difference of degree, it is not possible to ignore the fact that there are individual differences in its perception. The vast majority of people, however, share a common perception within a certain range of fluctuation, so the range where the brightness and contrast of digital images being compared can be judged the same by the visual perception of the vast majority of people, not including specific persons such as persons judged medically color blind, is defined as "substantially matching with the visual perception".

Sixth Embodiment

This embodiment indicates the result obtained from the following experiment of the present invention applied to photographing the beautiful ravine called TENJIN-KYO, located in the central area of Hokkaido, Japan. In this experiment, a series of digital photographs were taken using a Canon D30® digital camera by applying "shutter priority mode" under the following conditions indicated in Table 10, and thereafter computer image processing operations were carried out as explained later.

TABLE 10

| Shutter speed in fractions of a second | 1/125, 1/250, 1/350, 1/750, 1/1000 |
|---|---|
| Exposure compensation value | ±0 |
| ISO Sensitivity | 200 |

Figure 75:
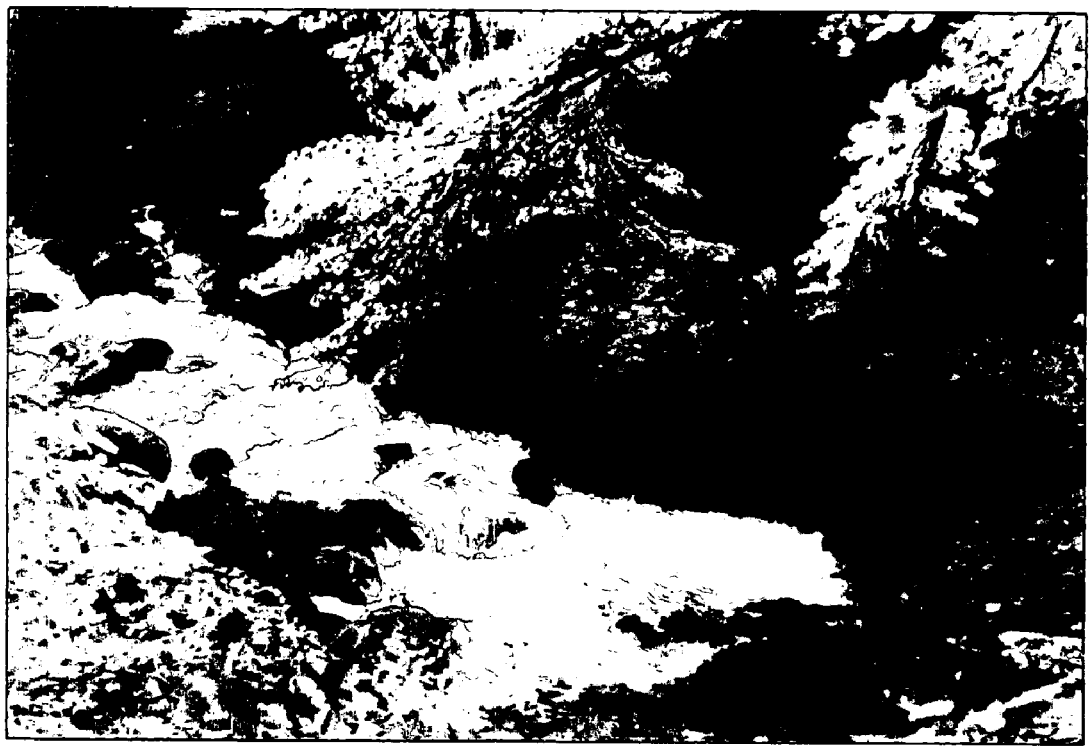
FIG. 75 is a digital photograph of the same subject as FIG. 70 made by the present invention from the digital image displayed on the monitor of a computer image processing system, corresponding to the digital photograph of FIG. 72.
Figure 76:
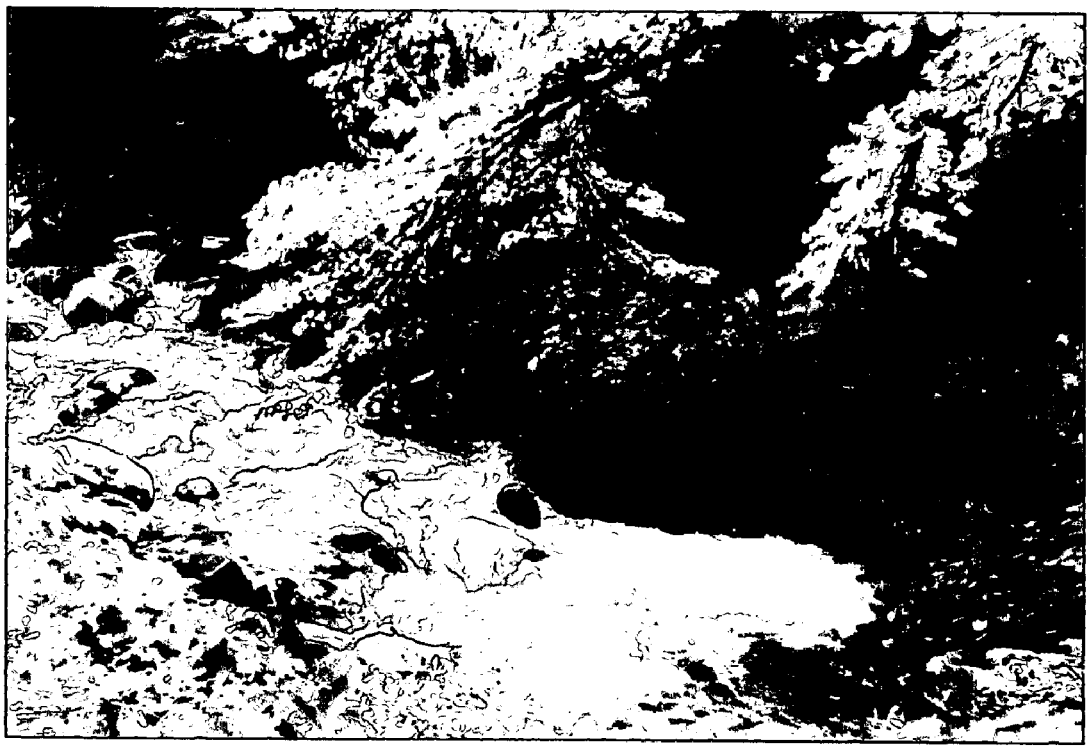
FIG. 76 is a digital photograph of the same subject as FIG. 70 made by the present invention from the digital image displayed on the monitor of a computer image processing system, corresponding to the digital photograph of FIG. 71.

The digital photographs taken as described above are indicated in FIG. 70, FIG. 71, FIG. 72, FIG. 73, FIG. 74, and the digital photographs finally obtained by the present invention characterized by claim 4 are indicated in FIG. 75 and FIG. 76.

Figure 70:
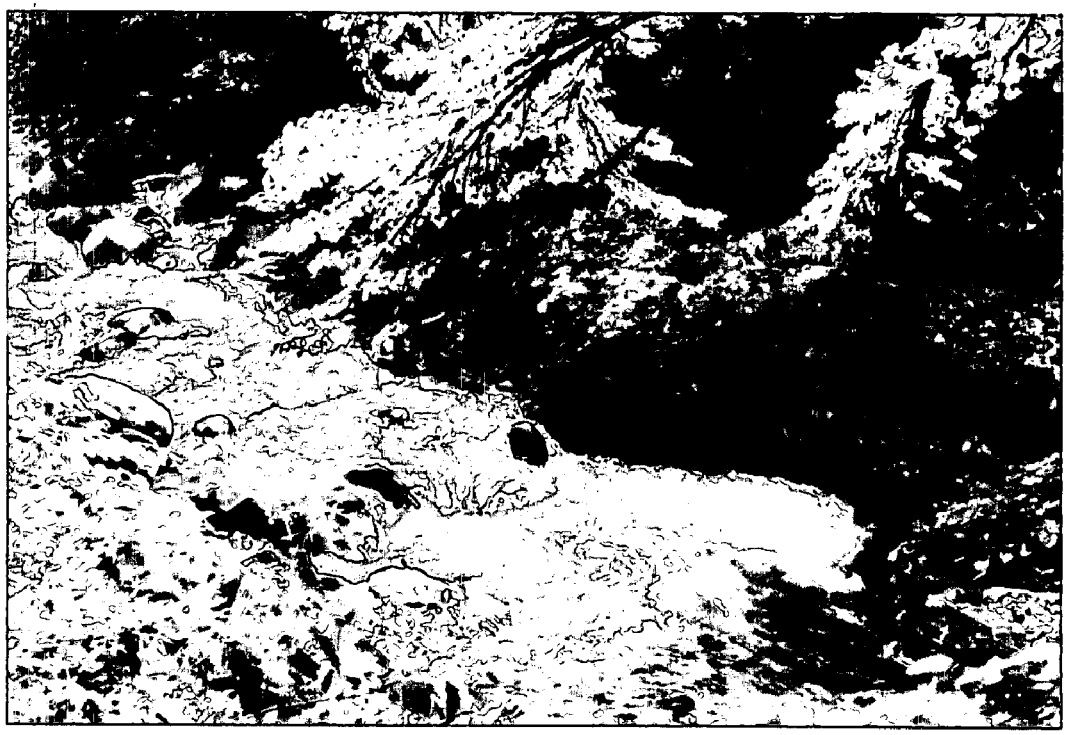
FIG. 70 is a digital photograph of the case of photographing as a subject the ravine called TENJIN-KYO located in the central area of Hokkaido, Japan, setting the shutter speed to 1/125 sec.
Figure 71:
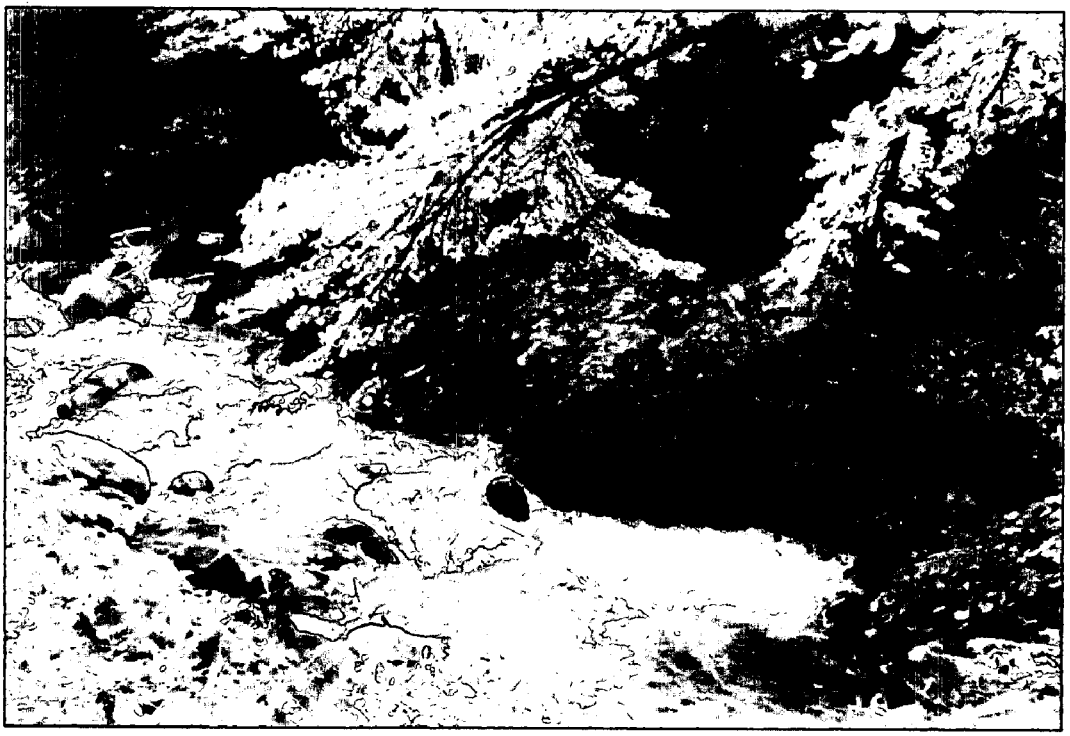
FIG. 71 is a digital photograph of the same subject as FIG. 70 taken at the shutter speed of 1/250 sec.

According to this experiment, it was found that the digital photograph of FIG. 70 cannot be accepted as a realistic digital photograph of the subject, because a water stream indicated in this photograph is affected by remarkable halation whereby the beauty of the subject is completely spoiled, in spite of indicating a realistic view of still elements surrounding the water stream, such as trees, rocks, etc.

On the other hand, it was confirmed that the digital photograph of FIGS. 71-74 indicate a dynamic flowing condition of the water stream, in spite of the fact that the still elements such as trees, rocks, etc. are indicated in a dark condition which cannot be accepted as a realistic image. It was also confirmed that the above-mentioned dark condition of still elements becomes more remarkable as the shutter speed is shortened.

Figure 72:
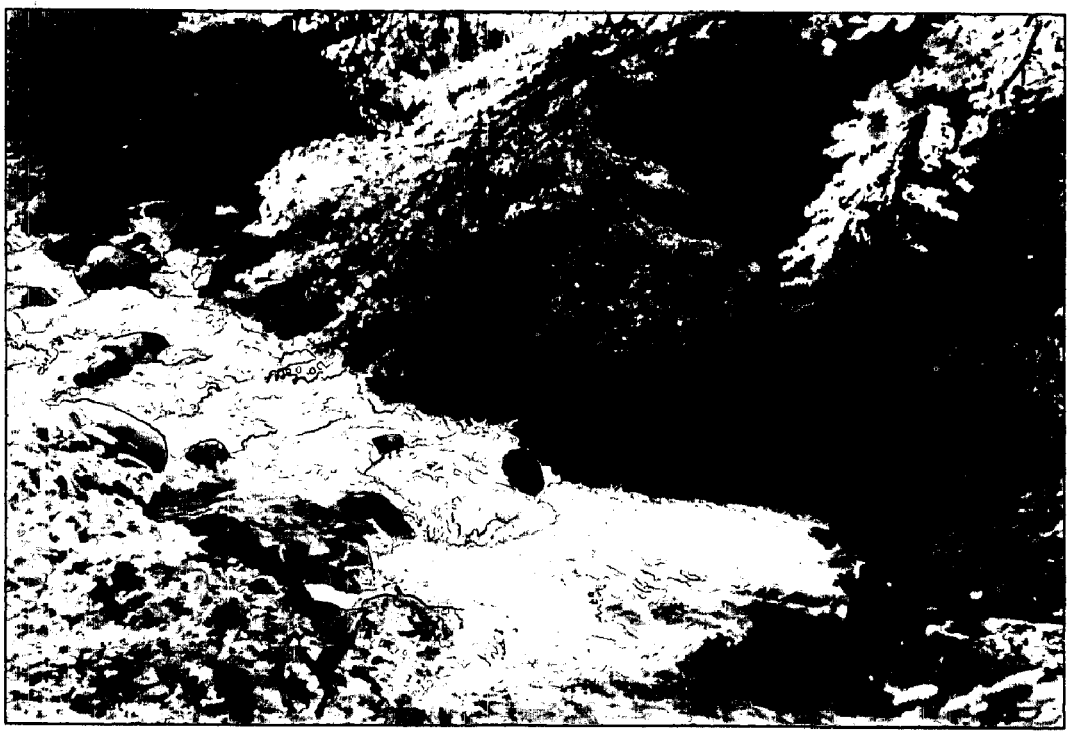
FIG. 72 is a digital photograph of the same subject as FIG. 70 taken at the shutter speed of 1/350 sec.
Figure 73:
FIG. 73 is a digital photograph of the same subject as FIG. 70 taken at the shutter speed of 1/750 sec.
Figure 74:
FIG. 74 is a digital photograph of the same subject as FIG. 70 taken at the shutter speed of 1/1000 sec.

In the above-mentioned condition of the digital photographs of FIGS. 71-74, the digital photograph of FIG. 72 taken at a shutter speed of 1/350 sec. can be selected as the most pertinent material to make a digital photograph indicating a realistic image of a water stream, because the water stream of the digital image indicates the most realistic image thereof. Therefore, the following computer image processing operation was applied to the digital image $P_1$ indicated on the monitor of the computer image processing system, based upon the digital photograph of FIG. 72, by applying a known color adjustment operation disclosed in the user's guide of Adobe Photoshop 4.0, chapter 6 and chapter 7 (Japanese edition).

Since the color modifying operation applied to the sixth embodiment can be understood as a "high level technique" in the field of known color modifying operation, this operation applied to the sixth embodiment is explained in detail, as follows.

As a first step operation, the entire area of still elements of digital image $P_1$ is selected in the condition that the water stream portion is excluded. This operation is carried out by firstly selecting the menu item "range of selection" and then selecting the menu item "color modification area" included in the pull down menu, then selecting an area of the static elements at a point marked "X" in the digital image $P_1$ indicated on the monitor of the computer image processing system as indicated in FIG. 72. According to the above operation, a small black and white representation of the image is indicated on the monitor. In this image, a data indication system for confirming the desired range of color modification is indicated, whereby the entire area of the desired range of color modification operations can be adjusted and the desired area for color matching operation can be confirmed by being outlined by a flickering dotted line surrounding the selected area, while on the other hand, the other area of the digital image which is protected from the color matching operation is indicated in a condition without being surrounded by the above-mentioned flickering dotted line.

Under the above-mentioned condition, the data indication signal system is operated to confirm the setting condition that the desired color matching operation can be carried out.

As the second step operation, the "Edit" menu is firstly selected from the main menu, then "Copy" is selected in the pull down menu. Thereafter, the item "layer paste" is selected in the "Edit" menu, whereby a digital image $P_2$ having a view identical to the digital image $P_1$ is indicated on the monitor of the system under the condition that the entire area of static elements can be subjected to color modification operation, while the other area of the digital image, that is, the area of the water stream does not substantially change from its realistic condition.

Then, a color matching operation is applied to the digital image $P_2$ to modify the color of the entire area of the static elements to create a condition in which the color of this entire area of the static elements is color matched to the color of the entire area of the static elements of the digital image $P_1$ corresponding to the photograph indicated in FIG. 70, while maintaining the realistic color condition of the water stream as indicated in the digital image $P_1$ corresponding to the digital photograph of FIG. 72. In other words, a digital image $P_3$ having a realistic image of the water stream and the entire area of the static elements is indicated on the monitor of the computer image processing system.

However, it must be recognized that the above-mentioned color matched digital image $P_3$ is composed of two components, that is a first layer formed by an entire area of the static elements to which the color matching operation is applied, and a back layer of the photographic subject, that is the original digital image $P_1$ indicated on the monitor of the system. Accordingly, it is necessary to integrate the above-mentioned two layers into one layer for printing. Therefore, as the next step operation, the above-mentioned two digital images of two layers are integrated to form a single layer, whereby a digital image $P_4$ composed of the realistic image of the water stream and being substantially color matched to the digital photograph indicated in FIG. 72, and the entire area of the static elements modified in color to match the digital photograph of FIG. 70, are integrated to form the digital image $P_4$, indicated on the monitor of the computer image processing system.

After completing the above-mentioned operation, the printed digital photograph indicated as FIG. 75 being substantially identical to the digital image $P_4$, was printed.

The following additional experiment was also performed. That is, since the contrast of the water stream of the ravine indicated in the digital photograph (FIG. 71) is weak from the view condition, the contrast of this portion of the digital image indicated on the monitor of the system is increased to a slightly stronger condition (+5) so that a digital image $Q_1$, which can be accepted as a digital image similar to the digital image $P_1$, can be indicated on the monitor of the computer image processing system used for the above-mentioned sixth experiment, and a color modification operation similar to the operation of the sixth experiment was applied to the digital image $Q_1$ to indicate a digital image $Q_2$ having a color substantially identical to the color of the digital image $P_4$, and therefore, the substantially identical result to that of the above mentioned experiment was obtained as indicated in FIG. 76.

While in the above mentioned sixth embodiment, additional color modification was applied to the final digital image $P_4$, indicated on the monitor of the computer image processing system to slightly change a part of the final digital image indicated on the monitor of the system, such a slight color modification can be accepted as a matter that should not deny the beneficial effect of the present invention.

It was confirmed that the above-mentioned color matching operation explained as the sixth embodiment can be carried out by the improved system based upon the software of Adobe Photoshop CS2, whereby the complicated operation such as "selection of layer paste", and "integration of two layers" are omitted.

EFFECTS OF THE INVENTION

In the explanation related to the sixth embodiment, a very effective method of color modification applied to the still elements is explained. It is normal that a mountain stream and waterfall usually include rocks and stones within the entire area thereof, and therefore the following method for selecting still elements as the target of color modification is also practically useful.

As the first step operation, the moving water element is provisionally selected by specifying a pure water portion based upon the color thereof, in the same condition, that is, black and white dots are indicated in the provisionally selected portion (not the target of color modification) of the moving water element on the monitor. In this condition, a popup window to adjust the provisionally selected area (element) for color modification is indicated on the monitor, whereby the entire area of range of provisional color modification can be adjusted by operating the popup window. After the operator confirms the provisionally selected area for color modification, the "OK" button in the popup window is clicked, and the popup window is dismissed.

As the second step operation, in the pull down menu "Select," the item "Inverse" is specified whereby the desired area of the still elements is selected for the color modification operation. Thereafter, the identical method applied to the sixth embodiment for indicating the digital image composed of above-mentioned selected still elements (first layer) and back layer on the monitor, is operated. In other words, a color modification operation can be applied to the above-mentioned selected area of the still elements (first layer).

Since the successive operation after the above-mentioned selection of the desired area of still elements for a color modification operation is identical to the corresponding operations of the sixth embodiments, the explanation of these successive operations is omitted.

What is claimed is:

1. A method of making a digital photograph of a subject composed of a moving water element and still elements surrounding said moving water element provided with a color condition (brightness, contrast, chroma and color balance) substantially matched to a naked eye view of said subject, comprising:

a first step operation of taking a photograph at a standard shutter speed in a range between 1/60 and 1/125 seconds, whereby said photograph is composed of still elements indicated in a color matched condition to said naked eye view, a second step operation of taking a series of photographs of said subject by applying a series of shutter speeds including a shutter speed identical to an estimated moving speed of said moving water element, said photographs then being displayed as respective digital images on a monitor of a computer image processing system, a third step operation of selecting one of said digital images based upon a color condition of said moving water element being substantially identical to said naked eye view thereof from said series of digital images indicated on said monitor in said second step operation, a fourth step operation of indicating a digital image based upon said digital image selected in said third step operation composed of a first layer and a back layer, the first layer indicating still elements to which color modification is applied in an overlapped condition to the back layer indicating said digital image selected in said third step operation, a fifth step of operation of applying a color modification to said first layer of said digital image indicated in said fourth step operation, for making said first layer substantially matched to a corresponding portion of said photographic image obtained in said first step operation, a sixth step operation to combine said first layer on which said color modification operation of said fifth step operation is completed and said digital image of said back layer in overlapped condition, whereby a material digital image for printing is made, and a seventh step operation to print said material digital image.

2. The method of claim 1, wherein said fourth step operation is carried out by directly specifying still elements to which color modification is to be applied.

3. The method of claim 1, wherein said fourth step operation is carried out in such condition that firstly, said moving water element is provisionally selected by specifying a color of said moving water element, secondly said still elements of said digital image are specified by inverting said provisionally selected portion of said digital image, and thereafter a digital image composed of a first layer indicating said specified still elements and said back layer is indicated on said monitor.

* * * * *